(12) United States Patent
Sagy

(10) Patent No.: US 10,740,094 B2
(45) Date of Patent: Aug. 11, 2020

(54) PERFORMANCE MONITORING OF SYSTEM VERSION RELEASES

(71) Applicant: ServiceNow, Inc., Santa Clara, CA (US)

(72) Inventor: Giora Sagy, Belvedere, CA (US)

(73) Assignee: ServiceNow, Inc., Santa Clara, CA (US)

( * ) Notice: Subject to any disclaimer, the term of this patent is extended or adjusted under 35 U.S.C. 154(b) by 128 days.

(21) Appl. No.: 16/026,665

(22) Filed: Jul. 3, 2018

(65) Prior Publication Data

US 2020/0012493 A1   Jan. 9, 2020

(51) Int. Cl.
  *G06F 15/173* (2006.01)
  *G06F 8/71* (2018.01)
  *H04L 12/26* (2006.01)

(52) U.S. Cl.
  CPC .............. *G06F 8/71* (2013.01); *H04L 43/028* (2013.01); *H04L 43/045* (2013.01); *H04L 43/08* (2013.01)

(58) Field of Classification Search
  CPC ...... G06F 16/2379; G06F 17/50; G06F 16/29; G06F 16/285; G06F 16/5838; G06F 21/31; G06F 16/23; G06F 16/2365; G06F 16/93; G06F 16/9535; G06F 1/163; G06T 7/70
  See application file for complete search history.

(56) References Cited

U.S. PATENT DOCUMENTS

| | | |
|---|---|---|
| 6,321,229 B1 | 11/2001 | Goldman |
| 6,816,898 B1 | 11/2004 | Scarpelli |
| 7,020,706 B2 | 3/2006 | Cates |
| 7,703,079 B1 | 4/2010 | Burrows et al. |
| 7,716,353 B2 | 5/2010 | Golovinsky |
| 7,769,718 B2 | 8/2010 | Murley |
| 7,925,981 B2 | 4/2011 | Pourheidari |
| 8,151,261 B2 | 4/2012 | Sirota |
| 8,612,408 B2 | 12/2013 | Trinon |
| 8,646,093 B2 | 2/2014 | Myers |

(Continued)

OTHER PUBLICATIONS

Extended European Search Report for European Patent Application No. 19183956.2 dated Feb. 11, 2020; 10 pgs.

*Primary Examiner* — Michael A Keller
*Assistant Examiner* — Thao D Duong
(74) *Attorney, Agent, or Firm* — Fletcher Yoder PC

(57) ABSTRACT

A system and method for comparative performance monitoring of software release versions is disclosed. A remote network management platform may include a computational instance for managing a network. Transactions between a server of the computational instance and a client device in the managed network may be logged to a database. Transactions may be carried out by a release version of a set of program code units executing on the server. A software application executing on a computing device may retrieve and analyze a first set of transactions carried out by a first release version of the set of program code units to determine a first set of performance metrics, and do the same for a second set of transactions carried out by a second release version of the set of program code units to determine a second set of performance metrics. A classification filter may be applied to the metrics, and a quantitative comparison of the filtered first and second sets of performance metrics may be displayed on graphical user device.

19 Claims, 14 Drawing Sheets

(56) References Cited

U.S. PATENT DOCUMENTS

| | | |
|---|---|---|
| 8,832,652 B2 | 9/2014 | Mueller |
| 9,065,783 B2 | 6/2015 | Ding |
| 9,098,322 B2 | 8/2015 | Apte |
| 9,317,327 B2 | 4/2016 | Apte |
| 9,363,252 B2 | 6/2016 | Mueller |
| 9,432,865 B1 * | 8/2016 | Jadunandan .......... H04W 24/08 |
| 9,448,913 B2 * | 9/2016 | Hoffmann ........... G06F 11/3612 |
| 9,535,737 B2 | 1/2017 | Joy |
| 9,645,833 B2 | 5/2017 | Mueller |
| 9,654,473 B2 | 5/2017 | Miller |
| 9,766,935 B2 | 9/2017 | Kelkar |
| 9,805,322 B2 | 10/2017 | Kelkar |
| 9,818,729 B1 | 11/2017 | Moon |
| 2009/0307347 A1 | 12/2009 | Cherkasova et al. |
| 2010/0257513 A1 | 10/2010 | Thirumalai et al. |
| 2014/0351412 A1 * | 11/2014 | Elisha ................. H04L 41/0806 709/224 |
| 2016/0283304 A1 * | 9/2016 | Horikawa ........... G06F 11/3409 |
| 2017/0026258 A1 * | 1/2017 | He .......................... G06F 9/542 |
| 2017/0085458 A1 | 3/2017 | Paul |
| 2018/0034721 A1 | 2/2018 | Dunn et al. |
| 2019/0188252 A1 * | 6/2019 | Vityaz ................... G06F 17/243 |

\* cited by examiner

FIG. 7C

PERFORMANCE MONITORING OF SYSTEM VERSION RELEASES

BACKGROUND

Managed networks may include various types of computer networks that can be remotely administered. This management may involve one or more computing devices disposed within a remote network management platform collecting information about the configuration and operational states of software applications executing on behalf on the managed network, and then presenting representations of this information by way of one or more user interfaces. The user interfaces may be, for instance, web-based user interfaces. In some instances, remote management of networks may be provided by a third party, such as a service provider or vendor.

A remote network management platform may take the form of a hosted environment that provides application Platform-as-a-Service (aPaaS) services to users, particularly to operators of a managed network such as enterprises. Such services may take the form of web-based portals and/or software applications that enterprises, and both internal and external users thereof, may access through one or another form of deployment of the remote network management platform.

A network management service provider or system vendor may update or upgrade system software from time to time. The service provider or vendor, as well as the customer or organizations whose networks they manage, may be interested in assessing performance of the updated or upgraded system.

SUMMARY

In accordance with example embodiments, a common remote network management platform may implement individualized network management for particular customers or organizations using a mix of physical and/or logical components to build constructs referred to herein as "computational instances." Operationally, a computational instance may make a set of web portals, services, and applications available to a particular customer. Both common and distinct infrastructure components, such as servers, databases, and software may be configured in an architecture that provides multiple computational instances for serving multiple customers or organizations. An enterprise or other entity can use a computational instance to access various web-based resources (e.g., web pages) provided by the remote network management platform, as well as other services. In an example deployment, a service provider or vendor may own and/or operate a common remote network management platform that includes multiple computational instances, each associated with, and supporting network management services for, a distinct enterprise, organization, or customer. At the level of an end user of an enterprise or organization, web-based resources may support mission-specific services or tasks, for example.

In an attempt to access a web-based resource, a client device of an enterprise may send a request to a server, and the server may then processes the request and provide the web-based resource to the client device. The act of the server processing the request may involve the server executing one or more program code units that define how the web-based resource operates, is accessed, is designed, and/or the information it provides. By way of example, program code units can include executable instructions, data (e.g., variables, constants, etc.), and configuration data. The server may complete the request by sending a response to the client device, and the client device may then utilize the information in the response. For example, the information may be used to display a webpage or other graphic output. In operation, a complete request/response cycle may typically be considered a transaction.

As a general matter, a given program code unit may be deployed by the remote network management platform on the computational instance by way of a software release for the computational instance. A software release may correspond to a version of the software, which may include multiple program code units as part of the release. A service provider or vendor may deploy some or all of a software release across multiple instances, allowing same or similar services in each instance to be implemented by a common set of program code units.

Every so often or from time to time, one or more computational instances may be upgraded from one software release to another, typically with an intent to add new features to the computational instance and/or to improve existing features and/or performance of the computational instance. These upgrades typically include changes to program code units and/or other data that was deployed on the computational instance in the previous software release. That is, some collection of new or upgraded versions of program code units may replace previous or older versions. The "roll-out" of an upgrade may or may not necessarily be carried out on all computational instances at the same time. But at some point in time, each computational instance may run at least some common set of program code units of the same version.

While upgrades are typically tested, verified, and validated prior to roll-out, system performance may not necessarily improve from one version to the next, depending, for example, on the purpose of a new/upgraded version. Further, the detailed manner in which a system software release operates in a production environment, such as a computational instance supporting remote network management for a given enterprise or organization, may differ from that in which it operates in a testing environment prior to roll-out. It may therefore be of interest to a service provider or vendor and/or to an enterprise or other customer of the service provider or vendor to be able to evaluate comparative system performance before and after roll-out of a new or subsequent release version of the system software.

In accordance with example embodiments, various performance metrics of transactions, such as completion rates and server response times, may be used carry out such a comparative evaluation. More particularly, one or more metrics of the amount of time it takes to complete transactions may be collected for system operation under two or more versions of software releases. For example, the metrics may be collected within different time intervals during which different software release versions were operational. Analyses and comparisons of the collected metrics may then be used quantify the impact of upgrades or updates on system performance. The comparisons may be made within individual computational instances, and/or across computational instances.

Accordingly, a first example embodiment may involve a computing system comprising: a database disposed within a remote network management platform, wherein the remote network management platform comprises a computational instance associated with a managed network, the database configured to log transactions carried out between: (i) a release version of a set of program code units executing on one or more server devices of the computational instance, and (ii) one or more client devices associated with the managed network; and a software application, configured to execute on a computing device disposed within the remote network management platform, further configured to: retrieve and analyze a first set of transactions that were carried out by a first release version of the set of program code units to determine a first set of performance metrics, the first set of performance metrics including first time-averaged completion rates of the first set of transactions for each of a plurality of transaction classifications; retrieve and analyze a second set of transactions that were carried out by a second release version of the set of program code units to determine a second set of performance metrics, the second set of performance metrics including second time-averaged completion rates of the second set of transactions for each of the plurality of transaction classifications; receive, from a user device, input specifying a classification filter to apply to the plurality of transaction classifications of each of the first and second sets of performance metrics; and provide, for display on a graphical user interface (GUI) of the user device, a quantitative comparison of the filtered first and second sets of performance metrics.

A second example embodiment may involve a computing system comprising: a database disposed within a remote network management platform, wherein the remote network management platform comprises a plurality of computational instances, each associated with a respective managed network, the database configured to log transactions carried out between: (i) a release version of a set of program code units executing on one or more server devices of the computational instances, and (ii) one or more client devices associated with the respective managed networks; and a software application, configured to execute on a computing device disposed within the remote network management platform, and further configured to: retrieve and analyze a first set of transactions that were carried out by a first release version of the set of program code units to determine a first set of performance metrics, the first set of performance metrics including first time-averaged completion rates of the first set of transactions for each of a plurality of transaction classifications; retrieve and analyze a second set of transactions that were carried out by a second release version of the set of program code units to determine a second set of performance metrics, the second set of performance metrics including second time-averaged completion rates of the second set of transactions for each of the plurality of transaction classifications; receive, from a user device, input specifying a classification filter to apply to the plurality of transaction classifications of each of the first and second sets of performance metrics; and provide, for display on a graphical user interface (GUI) of the user device, a quantitative comparison of the filtered first and second sets of performance metrics.

In a third example embodiment may involve a method carried out by one or more computing devices disposed within a remote network management platform, wherein the remote network management platform comprises a computational instance associated with a managed network, the method comprising: logging, to a database of the remote network management platform, transactions carried out between: (i) a release version of a set of program code units executing on one or more server devices of the computational instance, and (ii) one or more client devices associated with the managed network; retrieving and analyzing a first set of transactions that were carried out by a first release version of the set of program code units to determine a first set of performance metrics, the first set of performance metrics including first time-averaged completion rates of the first set of transactions for each of a plurality of transaction classifications; retrieving and analyzing a second set of transactions that were carried out by a second release version of the set of program code units to determine a second set of performance metrics, the second set of performance metrics including second time-averaged completion rates of the second set of transactions for each of the plurality of transaction classifications; receiving, from a user device, input specifying a classification filter to apply to the plurality of transaction classifications of each of the first and second sets of performance metrics; and providing, for display on a graphical user interface (GUI) of the user device, a quantitative comparison of the filtered first and second sets of performance metrics.

In a fourth example embodiment, a system may include various means for carrying out each of the operations of the first and/or second example embodiment.

These as well as other embodiments, aspects, advantages, and alternatives will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

BRIEF DESCRIPTION OF THE DRAWINGS

FIG. 7C depicts yet another example dashboard for performance monitoring of release versions in a remote network management architecture, in accordance with example embodiments.

DETAILED DESCRIPTION

Figure 1:
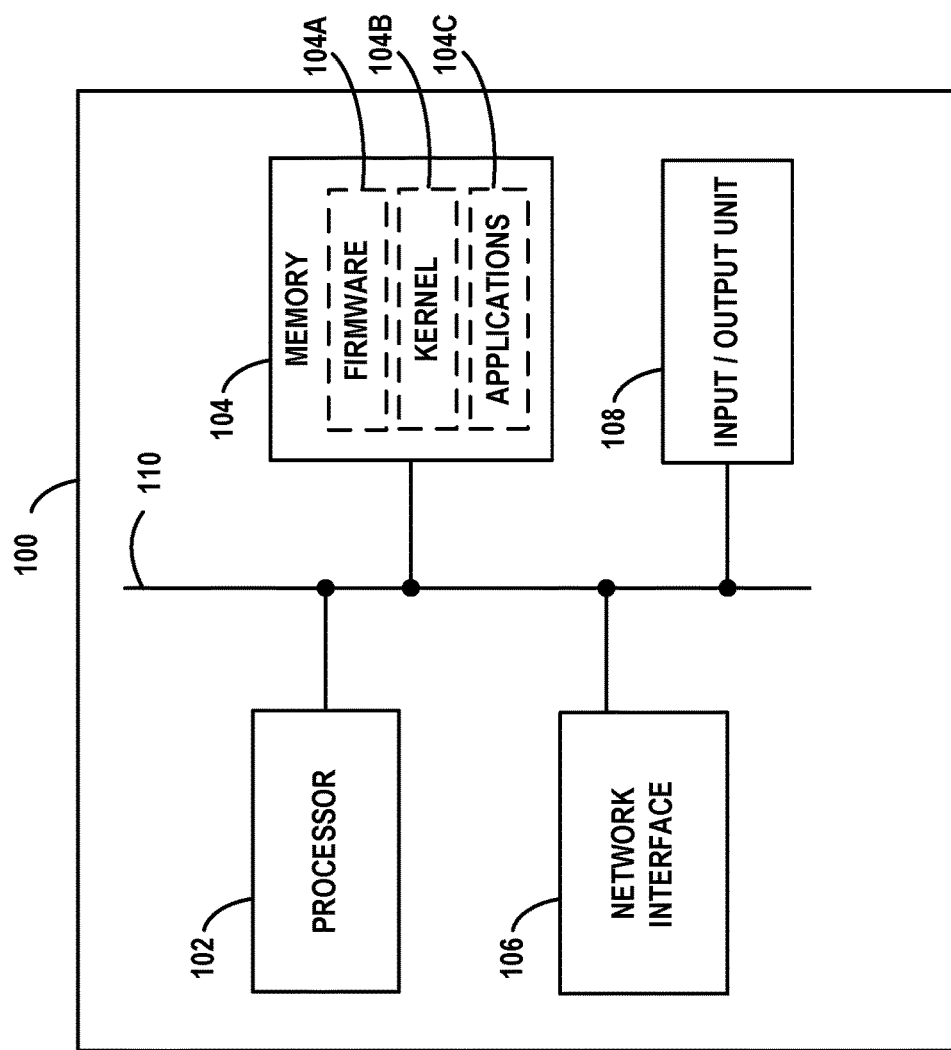
FIG. 1 illustrates a schematic drawing of a computing device, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. Introduction

A large enterprise is a complex entity with many interrelated operations. Some of these are found across the enterprise, such as human resources (HR), supply chain, information technology (IT), and finance. However, each enterprise also has its own unique operations that provide essential capabilities and/or create competitive advantages.

To support widely-implemented operations, enterprises typically use off-the-shelf software applications, such as customer relationship management (CRM) and human capital management (HCM) packages. However, they may also need custom software applications to meet their own unique requirements. A large enterprise often has dozens or hundreds of these custom software applications. Nonetheless, the advantages provided by the embodiments herein are not limited to large enterprises and may be applicable to an enterprise, or any other type of organization, of any size.

Many such software applications are developed by individual departments within the enterprise. These range from simple spreadsheets to custom-built software tools and databases. But the proliferation of siloed custom software applications has numerous disadvantages. It negatively impacts an enterprise's ability to run and grow its business, innovate, and meet regulatory requirements. The enterprise may find it difficult to integrate, streamline and enhance its operations due to lack of a single system that unifies its subsystems and data.

To efficiently create custom applications, enterprises would benefit from a remotely-hosted application platform that eliminates unnecessary development complexity. The goal of such a platform would be to reduce time-consuming, repetitive application development tasks so that software engineers and individuals in other roles can focus on developing unique, high-value features.

In order to achieve this goal, the concept of Application Platform as a Service (aPaaS) is introduced, to intelligently automate workflows throughout the enterprise. An aPaaS system is hosted remotely from the enterprise, but may access data, applications, and services within the enterprise by way of secure connections. Such an aPaaS system may have a number of advantageous capabilities and characteristics. These advantages and characteristics may be able to improve the enterprise's operations and workflow for IT, HR, CRM, customer service, application development, and security.

The aPaaS system may support development and execution of model-view-controller (MVC) applications. MVC applications divide their functionality into three interconnected parts (model, view, and controller) in order to isolate representations of information from the manner in which the information is presented to the user, thereby allowing for efficient code reuse and parallel development. These applications may be web-based, and offer create, read, update, delete (CRUD) capabilities. This allows new applications to be built on a common application infrastructure.

The aPaaS system may support standardized application components, such as a standardized set of widgets for graphical user interface (GUI) development. In this way, applications built using the aPaaS system have a common look and feel. Other software components and modules may be standardized as well. In some cases, this look and feel can be branded or skinned with an enterprise's custom logos and/or color schemes.

The aPaaS system may support the ability to configure the behavior of applications using metadata. This allows application behaviors to be rapidly adapted to meet specific needs. Such an approach reduces development time and increases flexibility. Further, the aPaaS system may support GUI tools that facilitate metadata creation and management, thus reducing errors in the metadata.

The aPaaS system may support clearly-defined interfaces between applications, so that software developers can avoid unwanted inter-application dependencies. Thus, the aPaaS system may implement a service layer in which persistent state information and other data is stored.

The aPaaS system may support a rich set of integration features so that the applications thereon can interact with legacy applications and third-party applications. For instance, the aPaaS system may support a custom employee-onboarding system that integrates with legacy HR, IT, and accounting systems.

The aPaaS system may support enterprise-grade security. Furthermore, since the aPaaS system may be remotely hosted, it should also utilize security procedures when it interacts with systems in the enterprise or third-party networks and services hosted outside of the enterprise. For example, the aPaaS system may be configured to share data amongst the enterprise and other parties to detect and identify common security threats.

Other features, functionality, and advantages of an aPaaS system may exist. This description is for purpose of example and is not intended to be limiting.

As an example of the aPaaS development process, a software developer may be tasked to create a new application using the aPaaS system. First, the developer may define the data model, which specifies the types of data that the application uses and the relationships therebetween. Then, via a GUI of the aPaaS system, the developer enters (e.g., uploads) the data model. The aPaaS system automatically creates all of the corresponding database tables, fields, and relationships, which can then be accessed via an object-oriented services layer.

In addition, the aPaaS system can also build a fully-functional MVC application with client-side interfaces and server-side CRUD logic. This generated application may serve as the basis of further development for the user. Advantageously, the developer does not have to spend a large amount of time on basic application functionality. Further, since the application may be web-based, it can be accessed from any Internet-enabled client device. Alternatively or additionally, a local copy of the application may be able to be accessed, for instance, when Internet service is not available.

The aPaaS system may also support a rich set of pre-defined functionality that can be added to applications. These features include support for searching, email, templating, workflow design, reporting, analytics, social media, scripting, mobile-friendly output, and customized GUIs.

The following embodiments describe architectural and functional aspects of example aPaaS systems, as well as the features and advantages thereof.

II. Example Computing Devices and Cloud-based Computing Environments

FIG. 1 is a simplified block diagram exemplifying a computing device 100, illustrating some of the components that could be included in a computing device arranged to operate in accordance with the embodiments herein. Computing device 100 could be a client device (e.g., a device actively operated by a user), a server device (e.g., a device that provides computational services to client devices), or some other type of computational platform. Some server devices may operate as client devices from time to time in order to perform particular operations, and some client devices may incorporate server features.

In this example, computing device 100 includes processor 102, memory 104, network interface 106, and an input/output unit 108, all of which may be coupled by a system bus 110 or a similar mechanism. In some embodiments, computing device 100 may include other components and/or peripheral devices (e.g., detachable storage, printers, and so on).

Processor 102 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 102 may be one or more single-core processors. In other cases, processor 102 may be one or more multi-core processors with multiple independent processing units. Processor 102 may also include register memory for temporarily storing instructions being executed and related data, as well as cache memory for temporarily storing recently-used instructions and data.

Memory 104 may be any form of computer-usable memory, including but not limited to random access memory (RAM), read-only memory (ROM), and non-volatile memory (e.g., flash memory, hard disk drives, solid state drives, compact discs (CDs), digital video discs (DVDs), and/or tape storage). Thus, memory 104 represents both main memory units, as well as long-term storage. Other types of memory may include biological memory.

Memory 104 may store program instructions and/or data on which program instructions may operate. By way of example, memory 104 may store these program instructions on a non-transitory, computer-readable medium, such that the instructions are executable by processor 102 to carry out any of the methods, processes, or operations disclosed in this specification or the accompanying drawings.

As shown in FIG. 1, memory 104 may include firmware 104A, kernel 104B, and/or applications 104C. Firmware 104A may be program code used to boot or otherwise initiate some or all of computing device 100. Kernel 104B may be an operating system, including modules for memory management, scheduling and management of processes, input/output, and communication. Kernel 104B may also include device drivers that allow the operating system to communicate with the hardware modules (e.g., memory units, networking interfaces, ports, and busses), of computing device 100. Applications 104C may be one or more user-space software programs, such as web browsers or email clients, as well as any software libraries used by these programs. Memory 104 may also store data used by these and other programs and applications.

Network interface 106 may take the form of one or more wireline interfaces, such as Ethernet (e.g., Fast Ethernet, Gigabit Ethernet, and so on). Network interface 106 may also support communication over one or more non-Ethernet media, such as coaxial cables or power lines, or over wide-area media, such as Synchronous Optical Networking (SONET) or digital subscriber line (DSL) technologies. Network interface 106 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 106. Furthermore, network interface 106 may comprise multiple physical interfaces. For instance, some embodiments of computing device 100 may include Ethernet, BLUETOOTH®, and Wifi interfaces.

Input/output unit 108 may facilitate user and peripheral device interaction with example computing device 100. Input/output unit 108 may include one or more types of input devices, such as a keyboard, a mouse, a touch screen, and so on. Similarly, input/output unit 108 may include one or more types of output devices, such as a screen, monitor, printer, and/or one or more light emitting diodes (LEDs). Additionally or alternatively, computing device 100 may communicate with other devices using a universal serial bus (USB) or high-definition multimedia interface (HDMI) port interface, for example.

In some embodiments, one or more instances of computing device 100 may be deployed to support an aPaaS architecture. The exact physical location, connectivity, and configuration of these computing devices may be unknown and/or unimportant to client devices. Accordingly, the computing devices may be referred to as "cloud-based" devices that may be housed at various remote data center locations.

Figure 2:
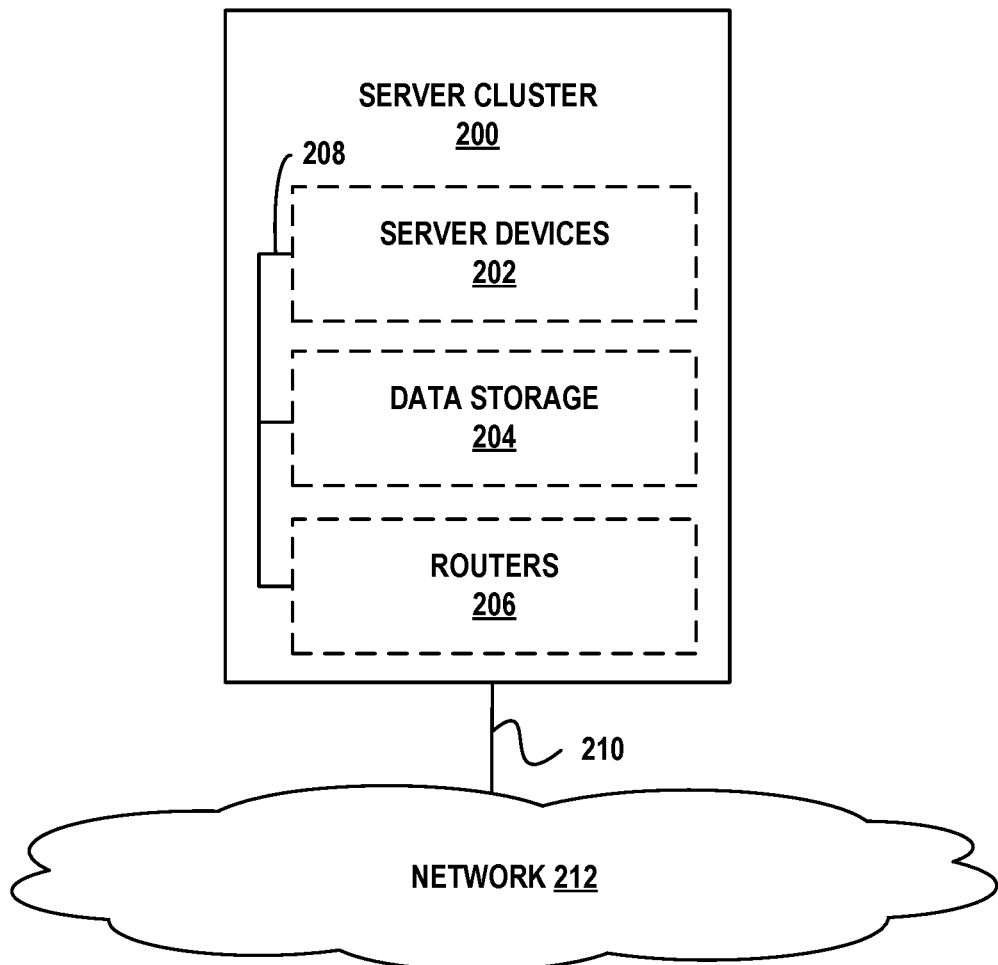
FIG. 2 illustrates a schematic drawing of a server device cluster, in accordance with example embodiments.

FIG. 2 depicts a cloud-based server cluster 200 in accordance with example embodiments. In FIG. 2, operations of a computing device (e.g., computing device 100) may be distributed between server devices 202, data storage 204, and routers 206, all of which may be connected by local cluster network 208. The number of server devices 202, data storages 204, and routers 206 in server cluster 200 may depend on the computing task(s) and/or applications assigned to server cluster 200.

For example, server devices 202 can be configured to perform various computing tasks of computing device 100. Thus, computing tasks can be distributed among one or more of server devices 202. To the extent that these computing tasks can be performed in parallel, such a distribution of tasks may reduce the total time to complete these tasks and return a result. For purpose of simplicity, both server cluster 200 and individual server devices 202 may be referred to as a "server device." This nomenclature should be understood to imply that one or more distinct server devices, data storage devices, and cluster routers may be involved in server device operations.

Data storage 204 may be data storage arrays that include drive array controllers configured to manage read and write access to groups of hard disk drives and/or solid state drives. The drive array controllers, alone or in conjunction with server devices 202, may also be configured to manage backup or redundant copies of the data stored in data storage 204 to protect against drive failures or other types of failures that prevent one or more of server devices 202 from accessing units of cluster data storage 204. Other types of memory aside from drives may be used.

Routers 206 may include networking equipment configured to provide internal and external communications for server cluster 200. For example, routers 206 may include one or more packet-switching and/or routing devices (including switches and/or gateways) configured to provide (i) network communications between server devices 202 and data storage 204 via cluster network 208, and/or (ii) network communications between the server cluster 200 and other devices via communication link 210 to network 212.

Additionally, the configuration of cluster routers 206 can be based at least in part on the data communication requirements of server devices 202 and data storage 204, the latency and throughput of the local cluster network 208, the latency, throughput, and cost of communication link 210, and/or other factors that may contribute to the cost, speed, fault-tolerance, resiliency, efficiency and/or other design goals of the system architecture.

As a possible example, data storage 204 may include any form of database, such as a structured query language (SQL) database. Various types of data structures may store the information in such a database, including but not limited to tables, arrays, lists, trees, and tuples. Furthermore, any databases in data storage 204 may be monolithic or distributed across multiple physical devices.

Server devices 202 may be configured to transmit data to and receive data from cluster data storage 204. This transmission and retrieval may take the form of SQL queries or other types of database queries, and the output of such queries, respectively. Additional text, images, video, and/or audio may be included as well. Furthermore, server devices 202 may organize the received data into web page representations. Such a representation may take the form of a markup language, such as the hypertext markup language (HTML), the extensible markup language (XML), or some other standardized or proprietary format. Moreover, server devices 202 may have the capability of executing various types of computerized scripting languages, such as but not limited to Perl, Python, PHP Hypertext Preprocessor (PHP), Active Server Pages (ASP), JavaScript, and so on. Computer program code written in these languages may facilitate the providing of web pages to client devices, as well as client device interaction with the web pages.

III. Example Remote Network Management Architecture

Figure 3:
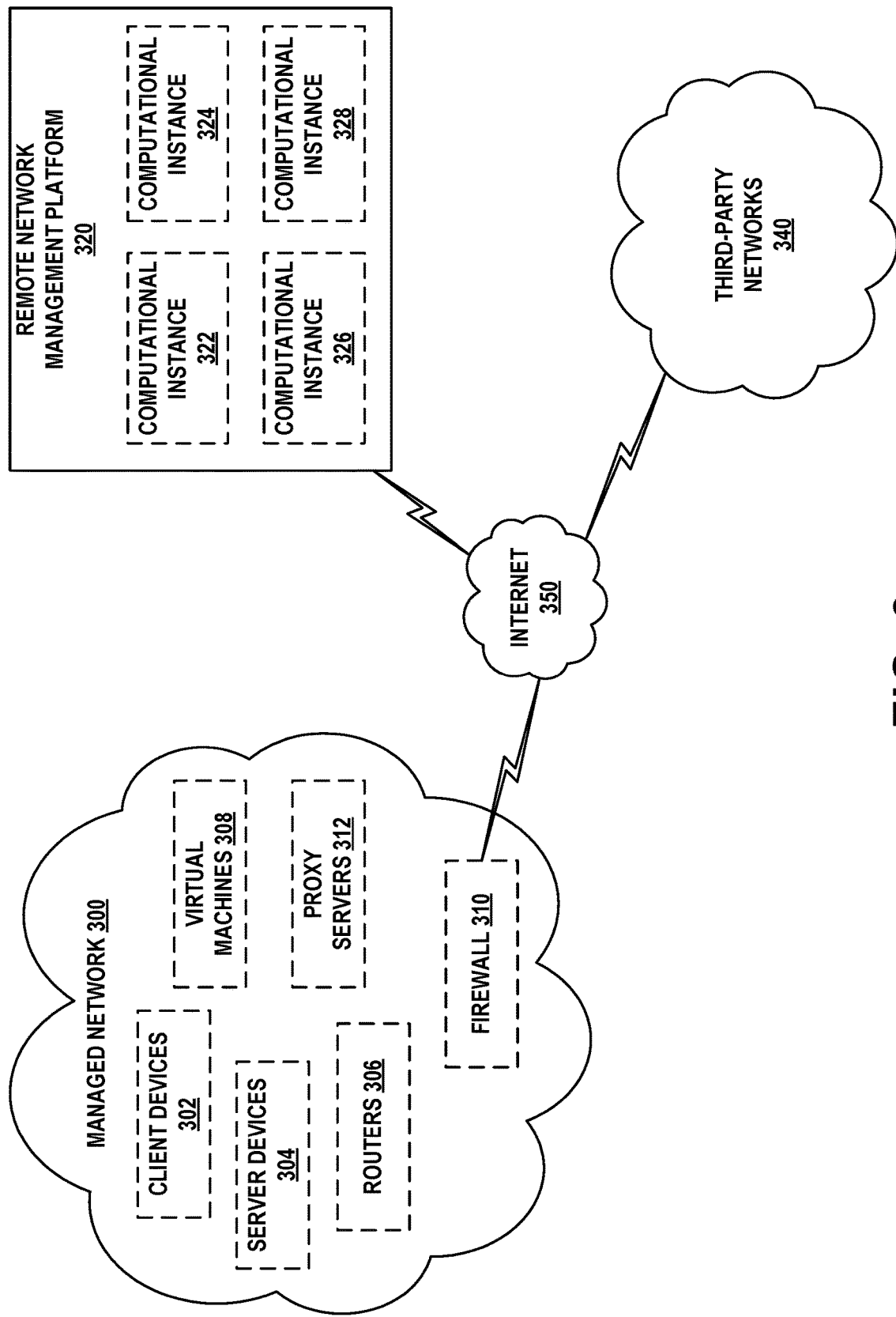
FIG. 3 depicts a remote network management architecture, in accordance with example embodiments.

FIG. 3 depicts a remote network management architecture, in accordance with example embodiments. This architecture includes three main components, managed network 300, remote network management platform 320, and third-party networks 340, all connected by way of Internet 350.

Managed network 300 may be, for example, an enterprise network used by a business for computing and communications tasks, as well as storage of data. Thus, managed network 300 may include various client devices 302, server devices 304, routers 306, virtual machines 308, firewall 310, and/or proxy servers 312. Client devices 302 may be embodied by computing device 100, server devices 304 may be embodied by computing device 100 or server cluster 200, and routers 306 may be any type of router, switch, or gateway.

Virtual machines 308 may be embodied by one or more of computing device 100 or server cluster 200. In general, a virtual machine is an emulation of a computing system, and mimics the functionality (e.g., processor, memory, and communication resources) of a physical computer. One physical computing system, such as server cluster 200, may support up to thousands of individual virtual machines. In some embodiments, virtual machines 308 may be managed by a centralized server device or application that facilitates allocation of physical computing resources to individual virtual machines, as well as performance and error reporting. Enterprises often employ virtual machines in order to allocate computing resources in an efficient, as needed fashion. Providers of virtualized computing systems include VMWARE® and MICROSOFT®.

Firewall 310 may be one or more specialized routers or server devices that protect managed network 300 from unauthorized attempts to access the devices, applications, and services therein, while allowing authorized communication that is initiated from managed network 300. Firewall 310 may also provide intrusion detection, web filtering, virus scanning, application-layer gateways, and other applications or services. In some embodiments not shown in FIG. 3, managed network 300 may include one or more virtual private network (VPN) gateways with which it communicates with remote network management platform 320 (see below).

Managed network 300 may also include one or more proxy servers 312. An embodiment of proxy servers 312 may be a server device that facilitates communication and movement of data between managed network 300, remote network management platform 320, and third-party networks 340. In particular, proxy servers 312 may be able to establish and maintain secure communication sessions with one or more computational instances of remote network management platform 320. By way of such a session, remote network management platform 320 may be able to discover and manage aspects of the architecture and configuration of managed network 300 and its components. Possibly with the assistance of proxy servers 312, remote network management platform 320 may also be able to discover and manage aspects of third-party networks 340 that are used by managed network 300.

Firewalls, such as firewall 310, typically deny all communication sessions that are incoming by way of Internet 350, unless such a session was ultimately initiated from behind the firewall (i.e., from a device on managed network 300) or the firewall has been explicitly configured to support the session. By placing proxy servers 312 behind firewall 310 (e.g., within managed network 300 and protected by firewall 310), proxy servers 312 may be able to initiate these communication sessions through firewall 310. Thus, firewall 310 might not have to be specifically configured to support incoming sessions from remote network management platform 320, thereby avoiding potential security risks to managed network 300.

In some cases, managed network 300 may consist of a few devices and a small number of networks. In other deployments, managed network 300 may span multiple physical locations and include hundreds of networks and hundreds of thousands of devices. Thus, the architecture depicted in FIG. 3 is capable of scaling up or down by orders of magnitude.

Furthermore, depending on the size, architecture, and connectivity of managed network 300, a varying number of proxy servers 312 may be deployed therein. For example, each one of proxy servers 312 may be responsible for communicating with remote network management platform 320 regarding a portion of managed network 300. Alternatively or additionally, sets of two or more proxy servers may be assigned to such a portion of managed network 300 for purposes of load balancing, redundancy, and/or high availability.

Remote network management platform 320 is a hosted environment that provides aPaaS services to users, particularly to the operators of managed network 300. These services may take the form of web-based portals, for instance. Thus, a user can securely access remote network management platform 320 from, for instance, client devices 302, or potentially from a client device outside of managed network 300. By way of the web-based portals, users may design, test, and deploy applications, generate reports, view analytics, and perform other tasks.

As shown in FIG. 3, remote network management platform 320 includes four computational instances 322, 324, 326, and 328. Each of these instances may represent a set of web portals, services, and applications (e.g., a wholly-functioning aPaaS system) available to a particular customer. In some cases, a single customer may use multiple computational instances. For example, managed network 300 may be an enterprise customer of remote network management platform 320, and may use computational instances 322, 324, and 326. The reason for providing multiple instances to one customer is that the customer may wish to independently develop, test, and deploy its applications and services. Thus, computational instance 322 may be dedicated to application development related to managed network 300, computational instance 324 may be dedicated to testing these applications, and computational instance 326 may be dedicated to the live operation of tested applications and services. A computational instance may also be referred to as a hosted instance, a remote instance, a customer instance, or by some other designation.

The multi-instance architecture of remote network management platform 320 is in contrast to conventional multi-tenant architectures, over which multi-instance architectures have several advantages. In multi-tenant architectures, data from different customers (e.g., enterprises) are comingled in a single database. While these customers' data are separate from one another, the separation is enforced by the software that operates the single database. As a consequence, a security breach in this system may impact all customers' data, creating additional risk, especially for entities subject to governmental, healthcare, and/or financial regulation. Furthermore, any database operations that impact one customer will likely impact all customers sharing that database. Thus, if there is an outage due to hardware or software errors, this outage affects all such customers. Likewise, if the database is to be upgraded to meet the needs of one customer, it will be unavailable to all customers during the upgrade process. Often, such maintenance windows will be long, due to the size of the shared database.

In contrast, the multi-instance architecture provides each customer with its own database in a dedicated computing instance. This prevents comingling of customer data, and allows each instance to be independently managed. For example, when one customer's instance experiences an outage due to errors or an upgrade, other computational instances are not impacted. Maintenance down time is limited because the database only contains one customer's data. Further, the simpler design of the multi-instance architecture allows redundant copies of each customer database and instance to be deployed in a geographically diverse fashion. This facilitates high availability, where the live version of the customer's instance can be moved when faults are detected or maintenance is being performed.

In order to support multiple computational instances in an efficient fashion, remote network management platform 320 may implement a plurality of these instances on a single hardware platform. For example, when the aPaaS system is implemented on a server cluster such as server cluster 200, it may operate a virtual machine that dedicates varying amounts of computational, storage, and communication resources to instances. But full virtualization of server cluster 200 might not be necessary, and other mechanisms may be used to separate instances. In some examples, each instance may have a dedicated account and one or more dedicated databases on server cluster 200. Alternatively, computational instance 322 may span multiple physical devices.

In some cases, a single server cluster of remote network management platform 320 may support multiple independent enterprises. Furthermore, as described below, remote network management platform 320 may include multiple server clusters deployed in geographically diverse data centers in order to facilitate load balancing, redundancy, and/or high availability.

Third-party networks 340 may be remote server devices (e.g., a plurality of server clusters such as server cluster 200) that can be used for outsourced computational, data storage, communication, and service hosting operations. These servers may be virtualized (i.e., the servers may be virtual machines). Examples of third-party networks 340 may include AMAZON WEB SERVICES® and MICROSOFT® Azure. Like remote network management platform 320, multiple server clusters supporting third-party networks 340 may be deployed at geographically diverse locations for purposes of load balancing, redundancy, and/or high availability.

Managed network 300 may use one or more of third-party networks 340 to deploy applications and services to its clients and customers. For instance, if managed network 300 provides online music streaming services, third-party networks 340 may store the music files and provide web interface and streaming capabilities. In this way, the enterprise of managed network 300 does not have to build and maintain its own servers for these operations.

Remote network management platform 320 may include modules that integrate with third-party networks 340 to expose virtual machines and managed services therein to managed network 300. The modules may allow users to request virtual resources and provide flexible reporting for third-party networks 340. In order to establish this functionality, a user from managed network 300 might first establish an account with third-party networks 340, and request a set of associated resources. Then, the user may enter the account information into the appropriate modules of remote network management platform 320. These modules may then automatically discover the manageable resources in the account, and also provide reports related to usage, performance, and billing.

Internet 350 may represent a portion of the global Internet. However, Internet 350 may alternatively represent a different type of network, such as a private wide-area or local-area packet-switched network.

Figure 4:
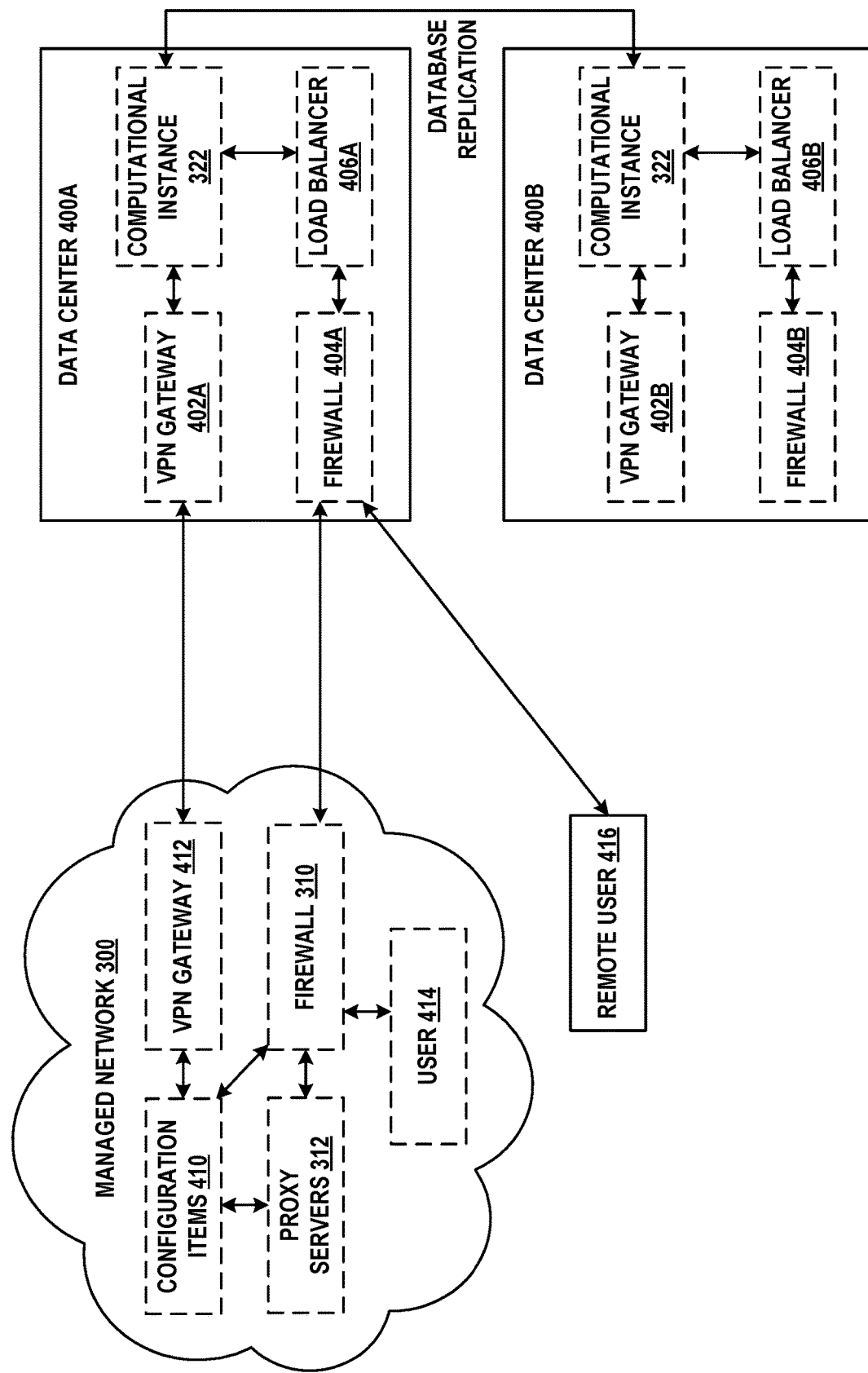
FIG. 4 depicts a communication environment involving a remote network management architecture, in accordance with example embodiments.

FIG. 4 further illustrates the communication environment between managed network 300 and computational instance 322, and introduces additional features and alternative embodiments. In FIG. 4, computational instance 322 is replicated across data centers 400A and 400B. These data centers may be geographically distant from one another, perhaps in different cities or different countries. Each data center includes support equipment that facilitates communication with managed network 300, as well as remote users.

In data center 400A, network traffic to and from external devices flows either through VPN gateway 402A or firewall 404A. VPN gateway 402A may be peered with VPN gateway 412 of managed network 300 by way of a security protocol such as Internet Protocol Security (IPSEC) or Transport Layer Security (TLS). Firewall 404A may be configured to allow access from authorized users, such as user 414 and remote user 416, and to deny access to unauthorized users. By way of firewall 404A, these users may access computational instance 322, and possibly other computational instances. Load balancer 406A may be used to distribute traffic amongst one or more physical or virtual server devices that host computational instance 322. Load balancer 406A may simplify user access by hiding the internal configuration of data center 400A, (e.g., computational instance 322) from client devices. For instance, if computational instance 322 includes multiple physical or virtual computing devices that share access to multiple databases, load balancer 406A may distribute network traffic and processing tasks across these computing devices and databases so that no one computing device or database is significantly busier than the others. In some embodiments, computational instance 322 may include VPN gateway 402A, firewall 404A, and load balancer 406A.

Data center 400B may include its own versions of the components in data center 400A. Thus, VPN gateway 402B, firewall 404B, and load balancer 406B may perform the same or similar operations as VPN gateway 402A, firewall 404A, and load balancer 406A, respectively. Further, by way of real-time or near-real-time database replication and/or other operations, computational instance 322 may exist simultaneously in data centers 400A and 400B.

Data centers 400A and 400B as shown in FIG. 4 may facilitate redundancy and high availability. In the configuration of FIG. 4, data center 400A is active and data center 400B is passive. Thus, data center 400A is serving all traffic to and from managed network 300, while the version of computational instance 322 in data center 400B is being updated in near-real-time. Other configurations, such as one in which both data centers are active, may be supported.

Should data center 400A fail in some fashion or otherwise become unavailable to users, data center 400B can take over as the active data center. For example, domain name system (DNS) servers that associate a domain name of computational instance 322 with one or more Internet Protocol (IP) addresses of data center 400A may re-associate the domain name with one or more IP addresses of data center 400B.

After this re-association completes (which may take less than one second or several seconds), users may access computational instance 322 by way of data center 400B.

FIG. 4 also illustrates a possible configuration of managed network 300. As noted above, proxy servers 312 and user 414 may access computational instance 322 through firewall 310. Proxy servers 312 may also access configuration items 410. In FIG. 4, configuration items 410 may refer to any or all of client devices 302, server devices 304, routers 306, and virtual machines 308, any applications or services executing thereon, as well as relationships between devices, applications, and services. Thus, the term "configuration items" may be shorthand for any physical or virtual device, or any application or service remotely discoverable or managed by computational instance 322, or relationships between discovered devices, applications, and services. Configuration items may be represented in a configuration management database (CMDB) of computational instance 322.

As noted above, VPN gateway 412 may provide a dedicated VPN to VPN gateway 402A. Such a VPN may be helpful when there is a significant amount of traffic between managed network 300 and computational instance 322, or security policies otherwise suggest or require use of a VPN between these sites. In some embodiments, any device in managed network 300 and/or computational instance 322 that directly communicates via the VPN is assigned a public IP address. Other devices in managed network 300 and/or computational instance 322 may be assigned private IP addresses (e.g., IP addresses selected from the 10.0.0.0-10.255.255.255 or 192.168.0.0-192.168.255.255 ranges, represented in shorthand as subnets 10.0.0.0/8 and 192.168.0.0/16, respectively).

IV. Example Device, Application, and Service Discovery

In order for remote network management platform 320 to administer the devices, applications, and services of managed network 300, remote network management platform 320 may first determine what devices are present in managed network 300, the configurations and operational statuses of these devices, and the applications and services provided by the devices, and well as the relationships between discovered devices, applications, and services. As noted above, each device, application, service, and relationship may be referred to as a configuration item. The process of defining configuration items within managed network 300 is referred to as discovery, and may be facilitated at least in part by proxy servers 312.

For purpose of the embodiments herein, an "application" may refer to one or more processes, threads, programs, client modules, server modules, or any other software that executes on a device or group of devices. A "service" may refer to a high-level capability provided by multiple applications executing on one or more devices working in conjunction with one another. For example, a high-level web service may involve multiple web application server threads executing on one device and accessing information from a database application that executes on another device.

Figure 5A:
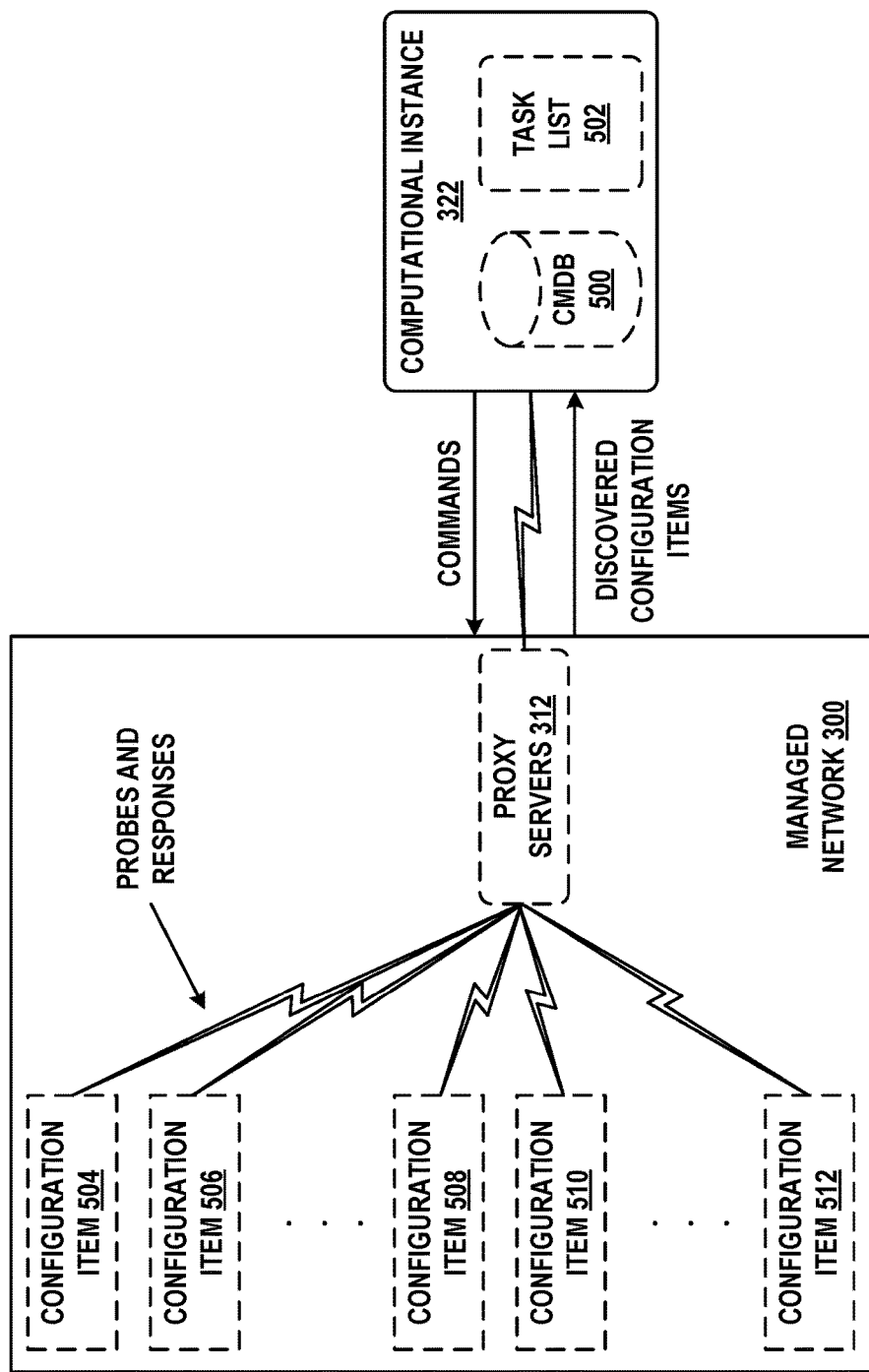
FIG. 5A depicts another communication environment involving a remote network management architecture, in accordance with example embodiments.

FIG. 5A provides a logical depiction of how configuration items can be discovered, as well as how information related to discovered configuration items can be stored. For sake of simplicity, remote network management platform 320, third-party networks 340, and Internet 350 are not shown.

In FIG. 5A, CMDB 500 and task list 502 are stored within computational instance 322. Computational instance 322 may transmit discovery commands to proxy servers 312. In response, proxy servers 312 may transmit probes to various devices, applications, and services in managed network 300. These devices, applications, and services may transmit responses to proxy servers 312, and proxy servers 312 may then provide information regarding discovered configuration items to CMDB 500 for storage therein. Configuration items stored in CMDB 500 represent the environment of managed network 300.

Task list 502 represents a list of activities that proxy servers 312 are to perform on behalf of computational instance 322. As discovery takes place, task list 502 is populated. Proxy servers 312 repeatedly query task list 502, obtain the next task therein, and perform this task until task list 502 is empty or another stopping condition has been reached.

To facilitate discovery, proxy servers 312 may be configured with information regarding one or more subnets in managed network 300 that are reachable by way of proxy servers 312. For instance, proxy servers 312 may be given the IP address range 192.168.0/24 as a subnet. Then, computational instance 322 may store this information in CMDB 500 and place tasks in task list 502 for discovery of devices at each of these addresses.

FIG. 5A also depicts devices, applications, and services in managed network 300 as configuration items 504, 506, 508, 510, and 512. As noted above, these configuration items represent a set of physical and/or virtual devices (e.g., client devices, server devices, routers, or virtual machines), applications executing thereon (e.g., web servers, email servers, databases, or storage arrays), relationships therebetween, as well as services that involve multiple individual configuration items.

Placing the tasks in task list 502 may trigger or otherwise cause proxy servers 312 to begin discovery. Alternatively or additionally, discovery may be manually triggered or automatically triggered based on triggering events (e.g., discovery may automatically begin once per day at a particular time).

In general, discovery may proceed in four logical phases: scanning, classification, identification, and exploration. Each phase of discovery involves various types of probe messages being transmitted by proxy servers 312 to one or more devices in managed network 300. The responses to these probes may be received and processed by proxy servers 312, and representations thereof may be transmitted to CMDB 500. Thus, each phase can result in more configuration items being discovered and stored in CMDB 500.

In the scanning phase, proxy servers 312 may probe each IP address in the specified range of IP addresses for open Transmission Control Protocol (TCP) and/or User Datagram Protocol (UDP) ports to determine the general type of device. The presence of such open ports at an IP address may indicate that a particular application is operating on the device that is assigned the IP address, which in turn may identify the operating system used by the device. For example, if TCP port 135 is open, then the device is likely executing a WINDOWS® operating system. Similarly, if TCP port 22 is open, then the device is likely executing a UNIX® operating system, such as LINUX®. If UDP port 161 is open, then the device may be able to be further identified through the Simple Network Management Protocol (SNMP). Other possibilities exist. Once the presence of a device at a particular IP address and its open ports have been discovered, these configuration items are saved in CMDB 500.

In the classification phase, proxy servers 312 may further probe each discovered device to determine the version of its operating system. The probes used for a particular device are based on information gathered about the devices during the scanning phase. For example, if a device is found with TCP port 22 open, a set of UNIX®-specific probes may be used. Likewise, if a device is found with TCP port 135 open, a set of WINDOWS®-specific probes may be used. For either case, an appropriate set of tasks may be placed in task list 502 for proxy servers 312 to carry out. These tasks may result in proxy servers 312 logging on, or otherwise accessing information from the particular device. For instance, if TCP port 22 is open, proxy servers 312 may be instructed to initiate a Secure Shell (SSH) connection to the particular device and obtain information about the operating system thereon from particular locations in the file system. Based on this information, the operating system may be determined. As an example, a UNIX® device with TCP port 22 open may be classified as AIX®, HPUX, LINUX®, MACOS®, or SOLARIS®. This classification information may be stored as one or more configuration items in CMDB 500.

In the identification phase, proxy servers 312 may determine specific details about a classified device. The probes used during this phase may be based on information gathered about the particular devices during the classification phase. For example, if a device was classified as LINUX®, a set of LINUX®-specific probes may be used. Likewise if a device was classified as WINDOWS® 2012, as a set of WINDOWS®-2012-specific probes may be used. As was the case for the classification phase, an appropriate set of tasks may be placed in task list 502 for proxy servers 312 to carry out. These tasks may result in proxy servers 312 reading information from the particular device, such as basic input/output system (BIOS) information, serial numbers, network interface information, media access control address(es) assigned to these network interface(s), IP address(es) used by the particular device and so on. This identification information may be stored as one or more configuration items in CMDB 500.

In the exploration phase, proxy servers 312 may determine further details about the operational state of a classified device. The probes used during this phase may be based on information gathered about the particular devices during the classification phase and/or the identification phase. Again, an appropriate set of tasks may be placed in task list 502 for proxy servers 312 to carry out. These tasks may result in proxy servers 312 reading additional information from the particular device, such as processor information, memory information, lists of running processes (applications), and so on. Once more, the discovered information may be stored as one or more configuration items in CMDB 500.

Running discovery on a network device, such as a router, may utilize SNMP. Instead of or in addition to determining a list of running processes or other application-related information, discovery may determine additional subnets known to the router and the operational state of the router's network interfaces (e.g., active, inactive, queue length, number of packets dropped, etc.). The IP addresses of the additional subnets may be candidates for further discovery procedures. Thus, discovery may progress iteratively or recursively.

Once discovery completes, a snapshot representation of each discovered device, application, and service is available in CMDB 500. For example, after discovery, operating system version, hardware configuration and network configuration details for client devices, server devices, and routers in managed network 300, as well as applications executing thereon, may be stored. This collected information may be presented to a user in various ways to allow the user to view the hardware composition and operational status of devices, as well as the characteristics of services that span multiple devices and applications.

Furthermore, CMDB 500 may include entries regarding dependencies and relationships between configuration items. More specifically, an application that is executing on a particular server device, as well as the services that rely on this application, may be represented as such in CMDB 500. For instance, suppose that a database application is executing on a server device, and that this database application is used by a new employee onboarding service as well as a payroll service. Thus, if the server device is taken out of operation for maintenance, it is clear that the employee onboarding service and payroll service will be impacted. Likewise, the dependencies and relationships between configuration items may be able to represent the services impacted when a particular router fails.

In general, dependencies and relationships between configuration items be displayed on a web-based interface and represented in a hierarchical fashion. Thus, adding, changing, or removing such dependencies and relationships may be accomplished by way of this interface.

Furthermore, users from managed network 300 may develop workflows that allow certain coordinated activities to take place across multiple discovered devices. For instance, an IT workflow might allow the user to change the common administrator password to all discovered LINUX® devices in single operation.

In order for discovery to take place in the manner described above, proxy servers 312, CMDB 500, and/or one or more credential stores may be configured with credentials for one or more of the devices to be discovered. Credentials may include any type of information needed in order to access the devices. These may include userid/password pairs, certificates, and so on. In some embodiments, these credentials may be stored in encrypted fields of CMDB 500. Proxy servers 312 may contain the decryption key for the credentials so that proxy servers 312 can use these credentials to log on to or otherwise access devices being discovered.

Figure 5B:
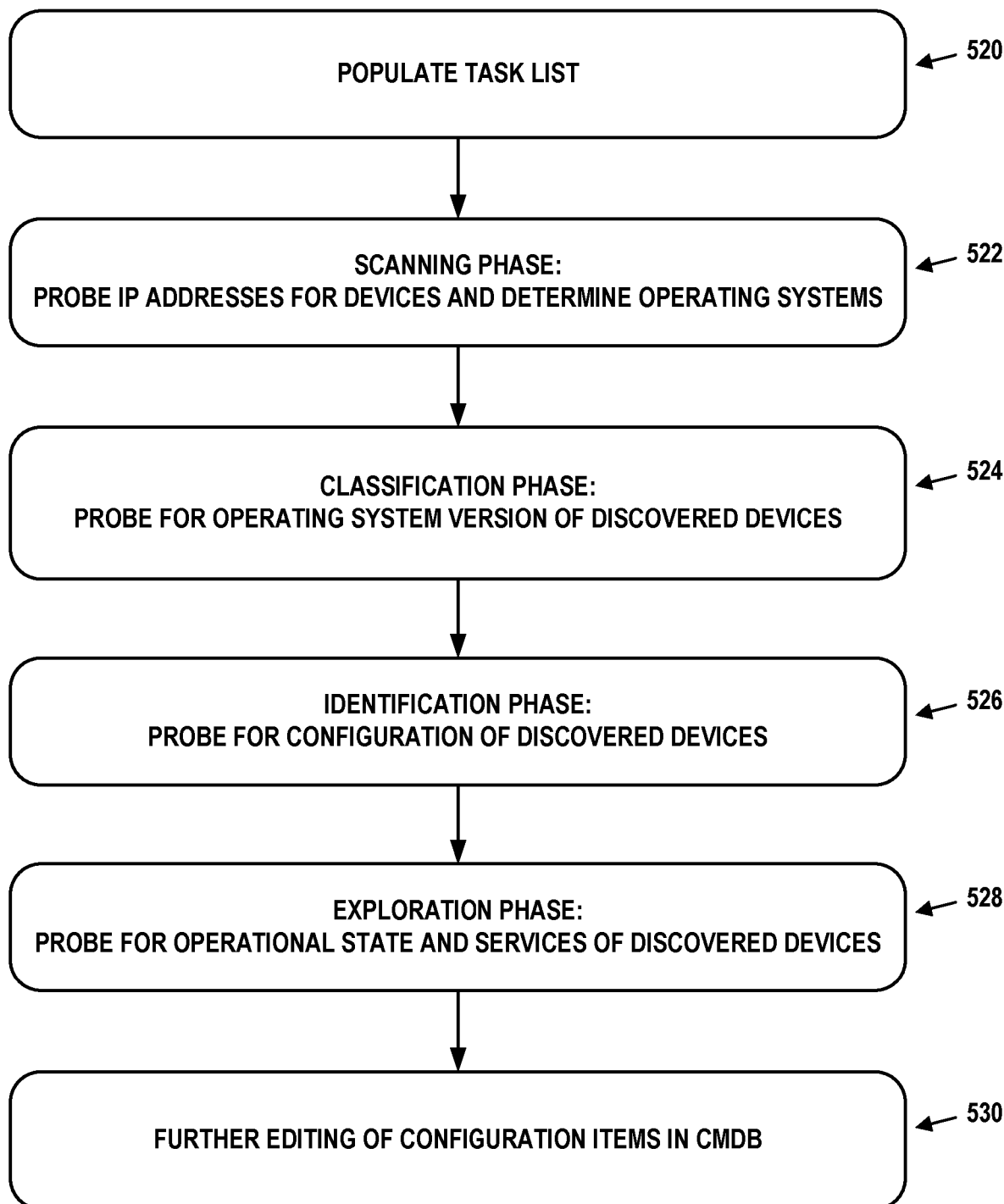
FIG. 5B is a flow chart, in accordance with example embodiments.

The discovery process is depicted as a flow chart in FIG. 5B. At block 520, the task list in the computational instance is populated, for instance, with a range of IP addresses. At block 522, the scanning phase takes place. Thus, the proxy servers probe the IP addresses for devices using these IP addresses, and attempt to determine the operating systems that are executing on these devices. At block 524, the classification phase takes place. The proxy servers attempt to determine the operating system version of the discovered devices. At block 526, the identification phase takes place. The proxy servers attempt to determine the hardware and/or software configuration of the discovered devices. At block 528, the exploration phase takes place. The proxy servers attempt to determine the operational state and applications executing on the discovered devices. At block 530, further editing of the configuration items representing the discovered devices and applications may take place. This editing may be automated and/or manual in nature.

The blocks represented in FIG. 5B are for purpose of example. Discovery may be a highly configurable procedure that can have more or fewer phases, and the operations of each phase may vary. In some cases, one or more phases may be customized, or may otherwise deviate from the exemplary descriptions above.

V. Example Comparative Performance of Software Release Versions

An enterprise or other entity associated with managed network 300 may use a computational instance (e.g., computational instance 322) of the remote network management platform 320 to access various web-based resources provided by the remote network management platform 320. A "web-based resource" may refer to any data or program code (e.g., a web page or other information) accessible by way of a transaction between a client device 302 and a web server (e.g., a web server application executing on a web server), where the web server is disposed within the computational instance 322. Further, a "transaction" may refer to any request transmitted from the client device 302 to the web server in an attempt to access a web-based resource. Upon receipt of such a request, the web server may process the request and, if the attempt is successful, the web server may provide a representation of the requested web-based resource to the client device 302.

For example, the enterprise may use a web browser on the client device 302 to enter a request to load a web page of the remote network management platform's web portal, and the web server may responsively provide the web page for display. As another example, the enterprise can request access to a web-based resource using a representational state transfer (REST) application programming interface (API) of the computational instance 322. Through this REST API, the client device 302 may engage in Hypertext Transfer Protocol (HTTP) communication with the web server to gain access to the web-based resource. The act of requesting access to the web-based resource may be referred to as a REST API call, and may involve the client device 302 transmitting a request to the web server in the form of a URL or other string identifying the web-based resource. Upon receipt of the request, the web server may process the request and transmit, to the client device 302, the web-based resource represented in HTML, XML, JavaScript Object Notation (JSON), or some other format.

As noted above, when processing a request to access a web-based resource, the web server can execute one or more program code units—namely, executable code, scripts, and/or other data—that define how the web-based resource operates, is accessed, is designed, and/or the information it provides.

By way of example, a program code unit can take the form of a record-based rule that defines actions that can be performed with respect to a record stored in a database (e.g., data storage 204). A record-based rule may be a server-side script that runs when a record stored in a database is displayed, inserted, updated, or deleted, or when a table in the database is queried. Record-based rules can be used to perform a variety of actions, such as specifying field values on a form that the user is updating, displaying messages to the user, preventing the user from accessing or modifying certain fields on a form, or preventing the user from adding new records in the database when certain criteria are met. Other actions are possible as well.

As another example, a program code unit can take the form of a user interface (UI) page. A UI page may be client-side and/or server-side code defining forms, dialogs, lists, or other UI components that make up a custom web page associated with a particular application or service. That code, when executed, may cause the custom web page to be provided and may facilitate subsequent interactions with the custom web page.

Additionally or alternatively, other such program code units can include UI macros (e.g., discrete, custom scripted controls or interfaces that can be added to a UI), UI actions (e.g., code defining operations related to buttons, links, and context menu items on forms and lists), UI policies (e.g., code or scripts that define how the behavior of information on a form can change and/or that define process flows for completing tasks), client scripts (e.g., client-side JavaScript that runs in a web browser), data policies (e.g., rules applied to data entered into the computational instance or received through web services), and/or script includes (e.g., server-side scripts that define a function or class), among other possible program code units. Program code units may also include or take the form of configuration data. Variations of the program code units listed above are possible as well. As executed by one or more server devices of a computational instance, program code units may thus implement various web-based services and applications provided by the computational instance.

Figure 6A:
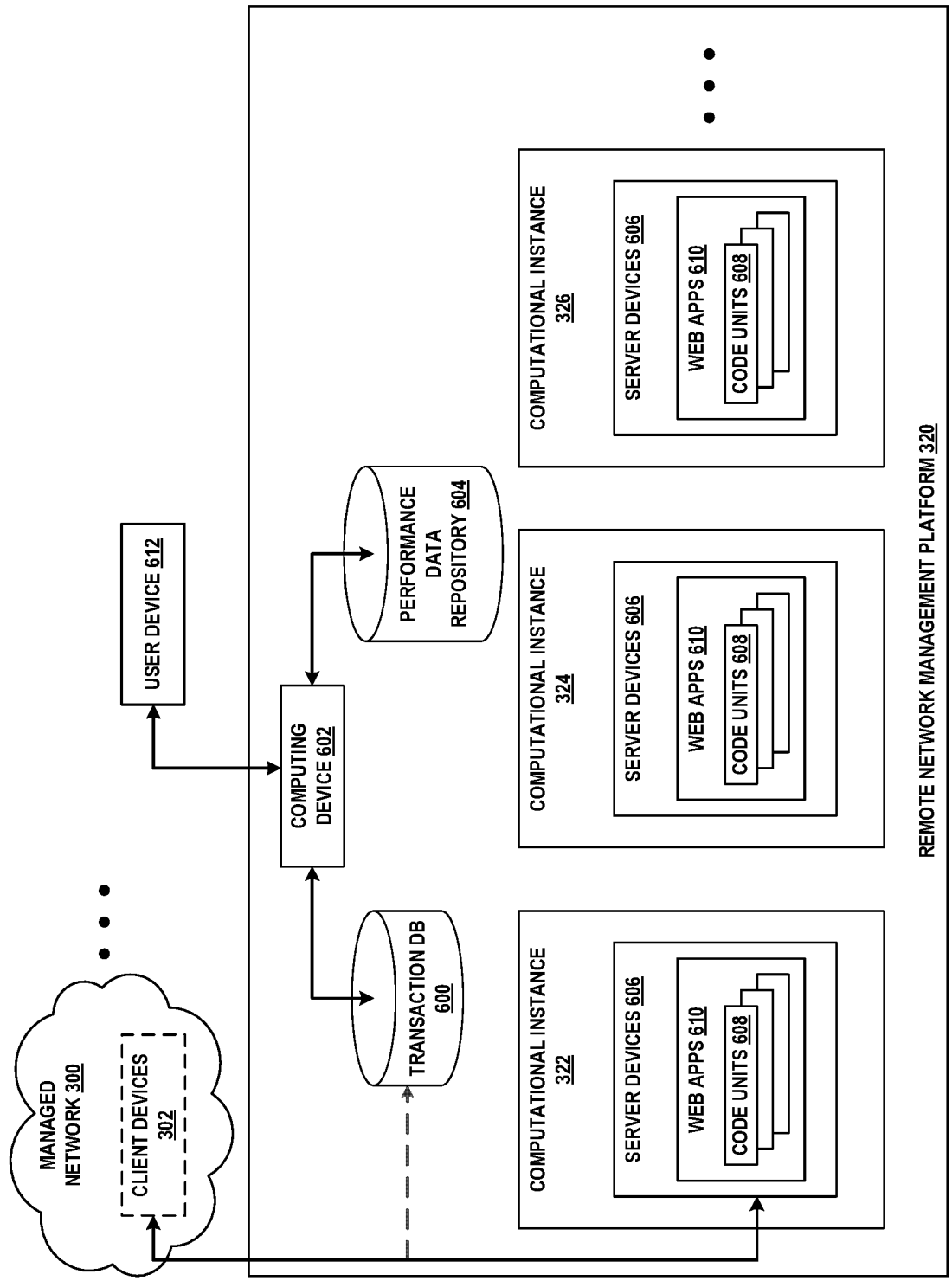
FIG. 6A depicts certain aspects of a remote network management architecture relating to performance monitoring of release versions, in accordance with example embodiments.

FIG. 6A depicts certain aspects of the remote network management platform 320 that illustrates additional details of the web-based functionality provided by computational instances described above. For the sake of brevity in the figure, only computational instances 322, 324, and 326 are shown. By way of example, each includes the same server devices 606, which in turn supports the same web apps 610 as implemented by the same program code units 608. Thus, in this particular example, the three computational instances shown are implemented as three virtual systems by common servers executing common code units providing a set of common web apps. Other configurations are possible as well. For example, each computational instance could be supported by a separate server or server cluster, each running separate instances of the web apps implemented by separate instances of the code units.

As also shown, the remote network management platform 320 includes a transaction database 600, a computing device 602, and a performance data repository 604. As described below, these three components, together with a user device 612, may provide the operational basis for monitoring of comparative performance of different release versions of software that implements the web services of the computational instances. By way of example, the user device 612, which could be a client device or workstation with graphical user interface, is shown as being external to the remote network management platform 320. This arrangement could correspond to the user device being remote from the platform. Additionally or alternatively, however, the user device could be part of the platform; e.g., directly or locally connected.

The example illustration further shows the managed network 300 and client devices 302, which may access services of the computational instance 322. Again for brevity, other components and elements of the managed network 300 are omitted from the figure. The client devices 302 may engage in transactions with web apps 610 executing on server devices 606. The double arrow connecting the client devices 302 with the server devices 606 in the computational instance 322 represents such transactions.

As described, the web apps 610 may be implemented by program code units 608. In accordance with example embodiments, at any given time or during a given interval, the program code units 608 may be part of a particular software release version. Typically, a software release for one or more computational instances, such as computational instances 322, 324, and 326, may include a variety of standard program code units that are associated with the remote network management platform 320 and that have been approved by an entity (e.g., a service provider) associated with the remote network management platform 320 for inclusion in that release. The remote network management platform 320 may also support features that enable enterprises to customize a computational instance by adding new program code units and/or modifying existing program code units (i.e., modifying a standard program code unit of a previous software release, or making a subsequent modification to a previously-modified standard program code unit). Similarly, enterprises may add new database tables and/or modify entries in existing database tables.

From time to time, one or more of the computational instances may undergo an upgrade during which the one or more of the computational instances are transitioned from one software release version to a subsequent software release version—namely, an upgrade from any previous software release preceding the subsequent software release to the subsequent software release. For example, the computational instance 322 may download an upgrade file that defines various changes between the previous software release and the subsequent software release, and the computational instance 322 may then apply some or all of those changes to itself. In line with the discussion above, such changes may include changes to program code units (e.g., adding new program code units or modifying existing program code units) and/or changes to other data associated with such program code units (e.g., modifying or deleting a database table that is queried when a record-based rule script is run).

Changes from one release version to another may represent relatively small changes, such as "patches" that may fix bugs or other issues. Additionally or alternatively, a subsequent release version may be a more substantive upgrade, including major enhancements, new features, and functional redesigns, among other changes. Customarily, the term "release version" may be more typically associated with such substantive upgrades than with patches and/or minor repairs or fixes. But in any case, the set of software code units that implements the web apps and other programs on the server devices are generally generated as part of a well-defined organizational construct that specifies dates of software builds, release descriptions, and other mechanisms of quality control and verification. Thus, for the purposes of the discussion herein, the terms "software release," "software release version," or the like, will be used to describe both major and minor upgrade/update features include in the associated set of program code units.

Further, it may not necessarily be the case that all computational instances are upgraded to a new release version at the same time. That is, a new release version of software may be rolled out simultaneously to all computational instances, incrementally to computational instances, or in some other asynchronous scheme. For example, as noted earlier, an enterprise may have two computational instances: one for production and another for testing. In such an arrangement, a new release may first be rolled out on the computational instance used for testing, and, later, after verification, rolled out in the production environment. In practice, there may also be intervals of time in which all computational instances are implementing the same release version. For example, if the time between two successive release versions is long compared with a roll-out and testing time, then all computational instances may eventually have the same release version, at least for some period of time, even if the roll-out was asynchronous.

Prior to roll-out of a new or upgraded release version, the upgraded software will typically be tested and verified. This may involve subjecting the upgraded system to a suite of tests and use cases, among other testing and verification activities, to help eliminate (or at least nearly so) errors and/or bugs in the upgrade program code units and the functions and operations they carry out. In addition, performance of various aspects of the upgraded software may be determined or predicted. More particularly, performance may be evaluated or predicted by exercising the test system with multiple use cases. In practice, however, there may be more and different types of uses cases in the production environments of the computational instances that support managed networks of the business enterprises and/or organizations that are the customers or subscribers of the service provider or vendor of the remote network management platform. Consequently, performance of a new release in a computational instance may differ from that predicted during pre-release testing. And even to the extent that pre-release testing may be a reasonably accurate predictor of performance in the production environment, not all aspects of a new release will necessarily even be expected to yield better performance than the previous release that it replaces.

It can happen that when a new release is rolled-out, certain operations and functions of the new release appear to perform worse than the same or similar operations and functions of the previous release (or even of one or more even earlier releases). Conversely, performance for various operations and functions may improve (or stay roughly the same) from one release to the next. Further, the size and quality of performance changes from one release version to another may vary within a computational instance according to the specific web apps or other service features invoked, and/or may vary across different instances. A service provider or vendor that supplies and rolls out new release versions to the computing instances that support the managed networks of its customers (e.g., business enterprises, organizations, etc.) may therefore be interested in being able to systematically and analytically compare performance of new release versions with one or more prior release versions. Customers of the service provider or vendor may also be interested in systematic comparisons. Such a comparison may be carried out between a rolled-out new release version and one or more prior ones, or between any two prior ones, and may be useful whether performance of one or more aspects of a system improves or degrades between release versions.

In accordance with example embodiments, comparative performance of two or more release versions of remote network management systems made operational at different, respective times on one or more computational instances may be achieved by monitoring and logging transactions carried out in the system at the different, respective times, and analyzing the logged transactions to determine performance metrics from the different, respective times that may then be compared. As described above, a transaction involves a request transmitted from a client device 302 in a managed network 300 to a server device 606 in a computational instance (e.g., computational instance 322), and a response transmitted back from the server device, following execution of instructions by server to process the request and generate and/or aggregate information for the response. The amount of time to complete a transaction is referred to herein as the transaction "response time," and may be measured effectively as the time between transmission of the request from the client device and return of the response to the client device. In practice, a transaction response time may include a sum of shorter times for carrying out various actions that make up the transaction. Non-limiting examples of such actions include network transmission times for the request and response messages, server processing time for carrying out steps at the server, resource waiting time for latency associated with waiting for necessary resources to be available and/or allocated, and database access times for those requests that may involve read/write operations with one or more databases.

For purposes of the present discussion, and as a first, reasonable approximation, server processing time will be assumed to account for the most impactful or sensitive portion of the total transaction response time. Accordingly, a comparison of the transaction response times for a given transaction carried out by two different release versions may provide a basis for a quantitative comparison of the performance of the two release versions, at least with respect to processing involved in the given transaction. To the extent that server processing time accounts for most of the response time, the difference in average response times between two release versions for a given transaction may provide a measure, then, of a change in server processing time resulting from changes in the code units that execute the transaction on the server.

However, other possible components of transaction response time may also be considered in comparative performance evaluations of release versions. As described below components of transaction response times may be tracked or monitored in different ways by different system components. In accordance with example embodiments, "raw" transaction data may be logged for all transactions during specified time intervals. These data may include individual transactions as captured by monitoring transmissions of requests and associated responses. At the same time, or nearly so, resource usage within computational instances or within the remote network management as a whole may be monitored such that usage patterns may be correlated with monitored transactions, at least within particular time frames. Resource usage may include allocation of semaphores for access to shared resources (e.g., databases), processing of database requests, and processing policy enforcement, among other aspects.

Referring again to FIG. 6A, some or all transactions between client devices 302 and the server devices 606 that implement the computational instance 322 may be logged to the transaction database 600. The dashed arrow pointing into the transaction database 600 represents this logging. In accordance with example embodiments, transactions may be logged continuously or during designated times, such as during intervals identified or known to be the busiest times of day. While logging during selective time intervals may not capture every possible transaction, arranging the interval (s) to be during busy periods may help ensure the most accurate and/or relevant metrics are logged.

Also in accordance with example embodiments, each logged transaction may include various pieces of information that may be used, either directly or through some form of analytical processing, as a measure of performance. As an example, time stamps indicating when a request from a client device was sent to a server device, and when the server device sent the response marking completion of the transaction, can be used to determine the time to complete the transaction (e.g., response time). In addition, information may be included that identifies the client device, the server device, the service or web application invoked by the request from the client device, and a web or network address to which the request was sent. Such additional information may be used to correlate transactions with resource usage, which may be tracked or monitored separately from transactions themselves. This example list of information associated with a transaction and logged to the transaction database is not limiting, and other information may be included as well. For example, each logged transaction may also identify the managed network, the computational instance, and/or an enterprise or other organization or entity associated with the transaction.

In example embodiments, the web application(s) invoked on the server by the request may be identifiable according to an associated web address, such as a uniform record locator (URL). In the context of web-based applications, a URL may function not only as a symbolic address of a web-based service or website hosting one or more services, but also may encode or include ancillary information used in processing the request. For example, a URL may contain information relating to a file system path, a query string, file navigation data, user information, and information specific to a web-based application invoked. Thus, a URL can serve as a specific identifier of a web-based service and server, such that among a multiplicity of logged transactions, URLs may provide effective and efficient "tags" for classification, sorting, and/or filtering of transactions for comparative performance evaluations.

More particularly, the specificity of URLs to particular web-based applications that may be invoked by virtue of web requests that include URLs may make URLs useful identifiers of software code units that implement the web-based applications. From the point of view of a service provider or vendor, a particular URL can be associated with particular software code units. As such, performance analysis of services or functions accessed via the particular URL may treat the URL as a proxy identifier of the software code units whose performance is being evaluated. In accordance with example embodiments, then, comparison of performance associated with like URLs of different software release versions can form a basis for comparison of the corresponding code units of the different release versions.

The illustration of FIG. 6A appears to show logging of only those transactions between the client device 302 in the managed network 300 and the server 606 and web apps 610 in the computational instance 322. However, in example embodiments, transactions between client devices in other managed networks associated with other computational instances 324, 326, and so on (as indicated by the horizontal ellipses) may also be logged to the transaction database 600. Thus, the transaction data base 600 may serve as a repository for some or all transactions involving some or all computational instances. The logged transactions may therefore be considered a form of raw performance data. The identifying information stored with each transaction may then be used to classify, sort, and/or filter the data at any stage of phase of further analysis, as described below.

In an example embodiment, the logging of transactions to the transaction database 600 may be accomplished using a standard logging facility, such as "syslog." As is known, syslog provides a standard and uniform interface for logging data from disparate types of systems and devices. In the present context of comparative performance monitoring of software release versions, syslog may facilitate a sort of "funnel" through which all (or some) transactions pass, so that they may be captured in the transaction database 600. Other standard and/or proprietary logging facilities could be used as well or instead of syslog, and the reference to syslog as a suitable logging facility is not intended to be limiting with respect to example embodiments herein.

In accordance with example embodiments, the computing device 602 may access the logged transactions in the transaction database 600 and perform various levels of analysis to generate performance metrics that may be used for comparing performance of two or more release versions for which transactions have been logged. Performance metrics may then be stored in the performance data repository 604 for further analysis and interactive examination and evaluation. In example embodiments, certain aspects of the processing for generating the performance metrics may be automated, while others may be invoked by users via the user device 612, for example.

In practice, the number of total transactions executed or carried out across all client devices in all managed networks associated with all computational instances may grow quite large. And in many practical cases, comparative performance of different release versions may be appropriately accomplished by way of statistical analysis of performance metrics and trends. For example, average response times or transaction rates per unit time during busy hours may be more revealing of performance that individual response times. By way of example, the time interval for computing averages response times or transaction rates could be one minute. However, other intervals could be used as well, such as every 30 seconds, or every 2, 5, or 10 minutes, for example. Other time intervals for computing time-averaged rates, response time, and other time-based metrics may be used as well.

From time to time, for example upon storing analyzed data from the transaction database 600 to the performance data repository 604, the transaction database 600 may be subject to overwriting by new incoming logged transactions. With such an arrangement, the transaction database 600 may serve as a sort of temporary repository of raw transaction data. However, some portion of raw transaction data may remain stored in the transaction database 600 past the time that those data have been analyzed and stored in the performance data repository 604. Other arrangements are possible as well.

Applying statistical analysis, such as time averaging, may be useful for determining and/or evaluating trends. For example, completion times and response times for individual transactions may be influenced by transient events in the network or the server. As such, metrics for individual transactions may not be representative of performance of the underlying code, but rather of possibly unrelated impediments or effects. Time averaging and other statistical techniques can help smooth over events that might otherwise be misinterpreted as related to performance.

In example embodiments, computations of time averages of transaction rates, response times, or other time-based metrics of transaction performance may also be categorized or classified according to other identifying information associated with the logged transactions analyzed. More particularly, time averages within and/or across classifications may be used to compare a variety of aspects of different software release versions. For example, performance of two or more software releases may be compared based on different URLs within a single computational instance, or based on the same URL across computational instances. In the former case, different URLs within a single instance for could be ranked URLs according to performance improvement or degradation before and after a software upgrade. This could be used to help evaluate the effect of the upgrade on different URLs (and the associated code units), and the analysis could be performed for each individual computational instance. In the latter case, performance of a given URL could be ranked according to computational instances before and after a software upgrade. This could help evaluate the effect of the upgrade of the given URL on different computational instances.

As another example, overall performance of two or more software release versions may be compared across computational instances. This could provide a more coarse-grained evaluation of software upgrades on a per-computational-instance basis, without necessarily accounting for individual URLs. Similar analyses of performance to those described above may be carried out with respect to specific server devices and/or user end-point devices in addition to or as alternatives to URLs and/or computational instances. These are just some examples.

As described above, the associated data stored with the logged transactions, including, but not limited to, web applications, URLs, server devices, computational instances, client devices, and software release version designations, may serve as categories or classes that may be used for selection when evaluating comparative performance of release versions. In accordance with example embodiments, the selection process may be implemented as a filter, where the classes or categories are filter criteria. For example, a filter could specify a comparison between two particular release versions, and further specify a set of URLs of each release version and one or more computational instances. It will be appreciated that a filter may be constructed from any one or more classes or categories of information associated with the logged transactions.

The performance data repository 604 may also serve as a repository for resource usage data. Additionally or alternatively, usage data may be tracked and/or monitored by some other database not necessarily shown in FIG. 6A. As described above, resource usage and/or allocation maybe correlated with transactions using identifying information in the transactions, such as associated web applications or URLs, time stamps, and embedded database queries, among other types of information. The ability to correlate transactions with other system resources may provide for richer analysis of comparative performance of release versions. Monitored information relating to resource usage may also serve as additional classes or categories for filtering. For example, a filter could include semaphore usage or queueing of semaphore requests. Other filter elements connected with resource usage could be used as well.

While time-averaged rates of transactions, completion times, response times, and the like, may serve as first-level metrics of performance, as described, other higher-level metrics may be derived as well, and may provide additional bases for evaluating performance. In particular, various weighting factors and/or functions may be applied to time-average-based metrics in order to further reveal or assess the relative quantitative importance of version changes to performance within one or more classes specified by a filter. In accordance with example embodiments, performance changes between two release versions may be measured by a metric referred to herein as "impact." In example embodiments, for any filter grouping of transactions, the impact of the difference of performance between two release versions may be computed as the difference in average response times (or time-averaged completion times) between the two release versions multiplied by the number of transactions of the filter grouping carried out for the later of the two release versions.

As defined above, the impact accounts not only for a difference in average completion times or rates of transactions between two release versions, but also on how big a factor the difference is relative to overall performance. For example, if an upgrade from a current to a new release version results in a 10% increase in average transaction response time for a given URL, but transactions involving the given URL is just 0.5% of all transactions since the new release version, then the impact is just 0.05%. In a more specific example, if the average response time for a given URL increases by one second in a new release version, and the number of transactions during a busy period for the new release version is 1,800, then the impact is 1,800 seconds, or 30 minutes. As another example, if the average response time for a different URL increases by 2.5 seconds in a new release version, but the number of transactions during a busy period for the new release version is 50, then the impact is just 125 seconds, or just over two minutes. These examples show how impact may be used to evaluate the relative performance of two release versions for the particular URLs. This type of analysis may be extended to allow impact-ranking among URLs. Further, it will be appreciated that similar analyses may be applied to various filter configurations in order to rank other classes, both within and across individual computational instances, according to impact.

A. Example Vertical and Horizontal Views

As described above, ancillary information associated with logged transactions may be used to configure a filter for selection of transactions used in comparative evaluation of software release versions. In accordance with example embodiments, filters may be used to refine or tune comparisons within an individual computational instance and across computational instances. For purposes of the discussion herein, a comparison within an individual computation instance is referred to as a "vertical view" and a comparison across computational instances is referred to as a "horizontal view." FIGS. 6B and 6C reproduce certain portions of FIG. 6A to illustrate the concepts and utilities of each view.

Figure 6B:
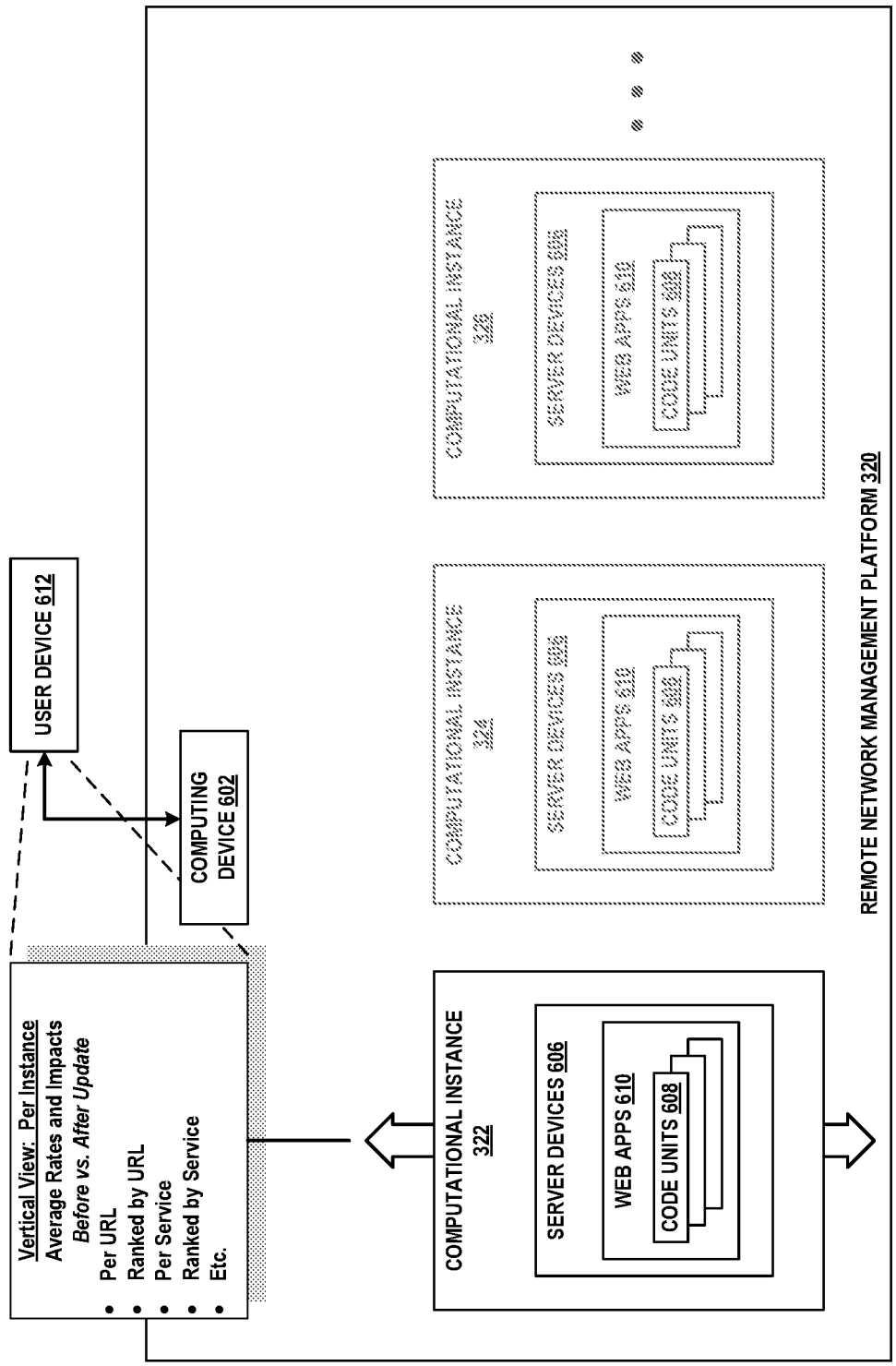
FIG. 6B is a conceptual illustration relating to performance monitoring of release versions within a computational instance of a remote network management architecture, in accordance with example embodiments.

In particular, FIG. 6B illustrates a vertical view through the computational instance 322. The managed network 300 is omitted from FIG. 6B, as are the transaction database 600 and performance data repository 604; the computational instances 324 and 326 are grayed-out. A broad double arrow vertically through the computational instance 322 is a visual cue indicating the vertical view. As indicated, the vertical view provides a per-instance comparison of two or more software release versions, designated as "Before vs. After Update" in the figure. Thus, by way of example, the illustration corresponds to two release versions, one a "before" and the other an "after." As such a comparison may be used to evaluate the impact(s) of a system upgrade. It will be appreciated, however, that the techniques described herein could be applied to any two or more release versions, either present vs. historical or two or more historical release versions.

As indicated in FIG. 6B, examples of before and after evaluations may include comparisons on a per URL basis, ranked by URL, per service basis, or ranked by service. These examples are not intended to be limiting. A per URL comparison could be used, for example, to help diagnose possible performance degradation of a particular URL following an upgrade. Such an evaluation could allow a system manager or other personnel to view the overall impact on the particular URL of an upgrade, as well as examine transaction components that contribute to the overall impact. These could include before and after comparisons of average server processing times, database access times, semaphore usage and queuing times, and network transmission times, among other possible components. In accordance with example embodiments, the contributions of each of these components may be determined according time-averaged response times for transactions associated with the particular URL as captured in the transaction log 600 over time intervals before and after the upgrade.

An evaluation ranked by URL may list URL according to the size of the impact of the upgrade. Such an evaluation could be used, for example, to identify potential problems associated with a URL resulting from an upgrade. Of course, such a list could also be used to highlight URLs that have improved performance as well. In either case, a system manager or other personnel may gain a better understanding of factors that may impact performance before and after an upgrade (or comparative performance between different release versions in general).

Similar evaluations and comparisons may be made based on the service(s) invoked by particular transactions, the server that carries out transactions, or system resources that are utilized as part of servicing transactions. Evaluations may be extended to include other filter selections as well.

Figure 6C:
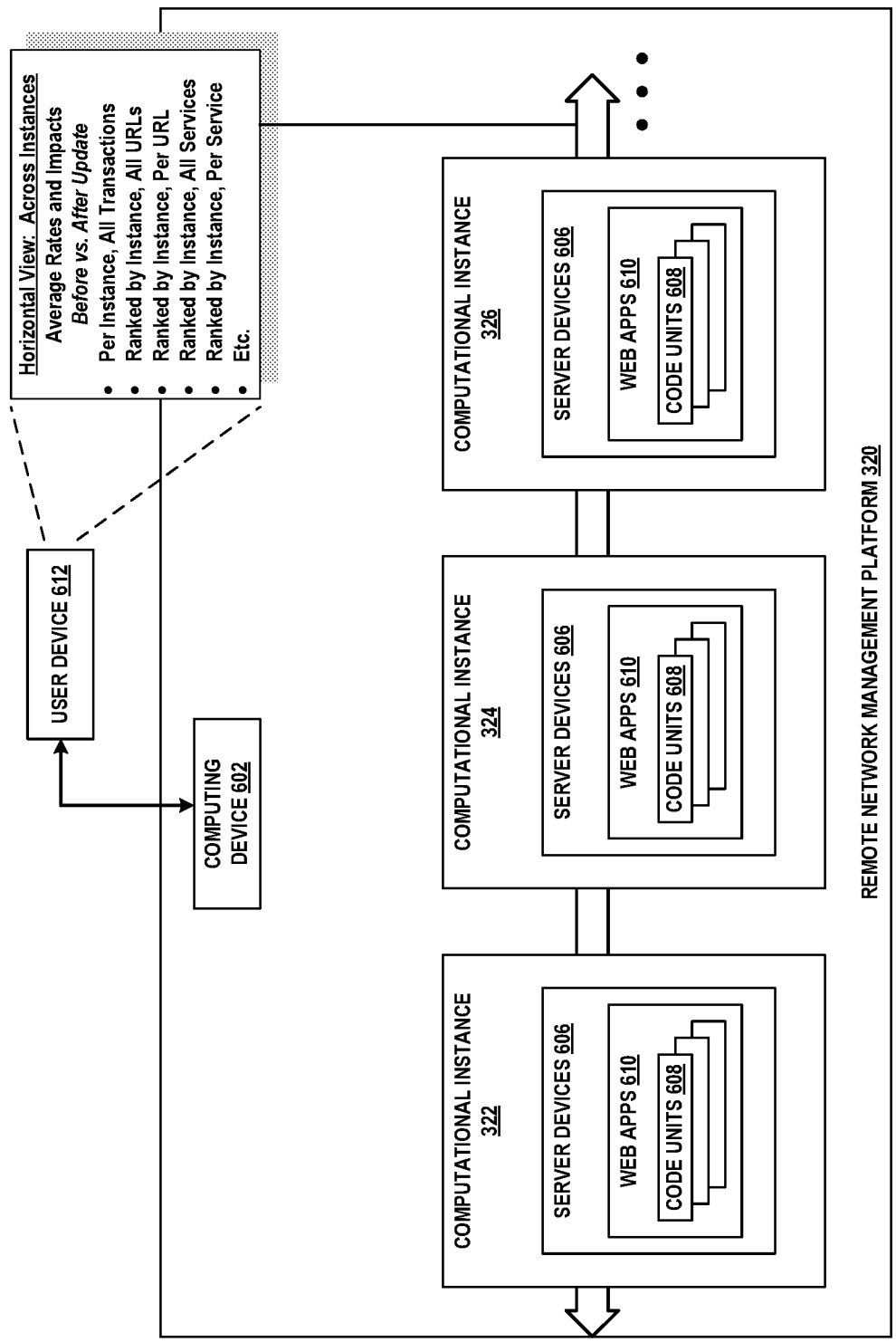
FIG. 6C is a conceptual illustration relating to performance monitoring of release versions across a computational instances of a remote network management architecture, in accordance with example embodiments.

FIG. 6C illustrates a horizontal view across the computational instances 322, 324, and 326. Again, the managed network 300 is omitted from FIG. 6C, as are the transaction database 600 and performance data repository 604. A broad double arrow horizontally through the computational instances 322, 324, and 326 is a visual cue indicating the horizontal view. As indicated, the horizontal view provides a cross-instance comparison of two or more software release versions, again designated as "Before vs. After Update" in the figure. Again, by way of example, the illustration corresponds to a comparison the impact(s) of a system upgrade, but in this case for the overall remote network management platform 320 in this case. Once more, the techniques described herein could be applied to any two or more release versions, either present vs. historical or two or more historical release versions.

As indicated in FIG. 6C, examples of before and after evaluations may include comparisons on a per computational instance basis for all transactions, ranked by computational instance, per service basis, or ranked by service. These examples are not intended to be limiting. A per computational instance comparison for all transactions could be used, for example, to help diagnose possible performance degradation of a particular computational instance following an upgrade. Such an evaluation could allow a system manager or other personnel to view the overall impact on the particular computational instance of an upgrade, as well as examine transaction components that contribute to the overall impact. These could include before and after comparisons of average server processing times, database access times, semaphore usage and queuing times, and network transmission times, among other possible components. In accordance with example embodiments, the contributions of each of these components may be determined according time-averaged response time for transactions associated with the particular computational instance as captured in the transaction log 600 over time intervals before and after the upgrade.

A per computational instance comparison for all transactions could be used to provide a vendor or service provider with a statistical evaluation a particular upgrade's impact across some or all computational instances. For example, the data could be used to form an "impact distribution" of the statistical frequency of impact values as a function of impact value. Such a distribution could be represented by a histogram. Other forms are possible as well. Individual computational instances, corresponding to particular customers or organization, for example, could then be located on the distribution according to their impact, and compared with statistical measures, such as mean, median, variance, and so on.

An evaluation ranked by computational instance for all URLs may list computational instances according to the size of the impact of the upgrade for all URLs. Such an evaluation could be used, for example, to compare overall performance between computational instances before and after an upgrade, or to identify potential problems and/or improvements associated with URL transactions for computational instances resulting from an upgrade. A similar evaluation could be carried out on a per-URL basis as well.

As with the vertical view, evaluations and comparisons in the horizontal view may be made based on the service(s) invoked by particular transactions, the server that carries out transactions, or system resources that are utilized as part of servicing transactions. Evaluations may be extended to include other filter selections as well.

B. Example Operation

The discussion above alluded to a system manager or other personnel engaging in various example comparative performance evaluations of different software release versions. In accordance with example embodiments, interactive performance evaluations and comparisons may be supported by one or more user devices, such as the user device 612 shown in FIGS. 6A-6C. As indicated, such a device could be configured remotely from the remote network management platform 320, or could be integrated as part of a local platform component. A user at the user device 612 could invoke various performance evaluation operations and functions on the computing device 602, for example. Operation of performance evaluations and comparisons are be illustrated by way of example in FIGS. 7A-7D, which depict hypothetical graphical "dashboards" of a graphical user interface (GUI).

Figure 7A:
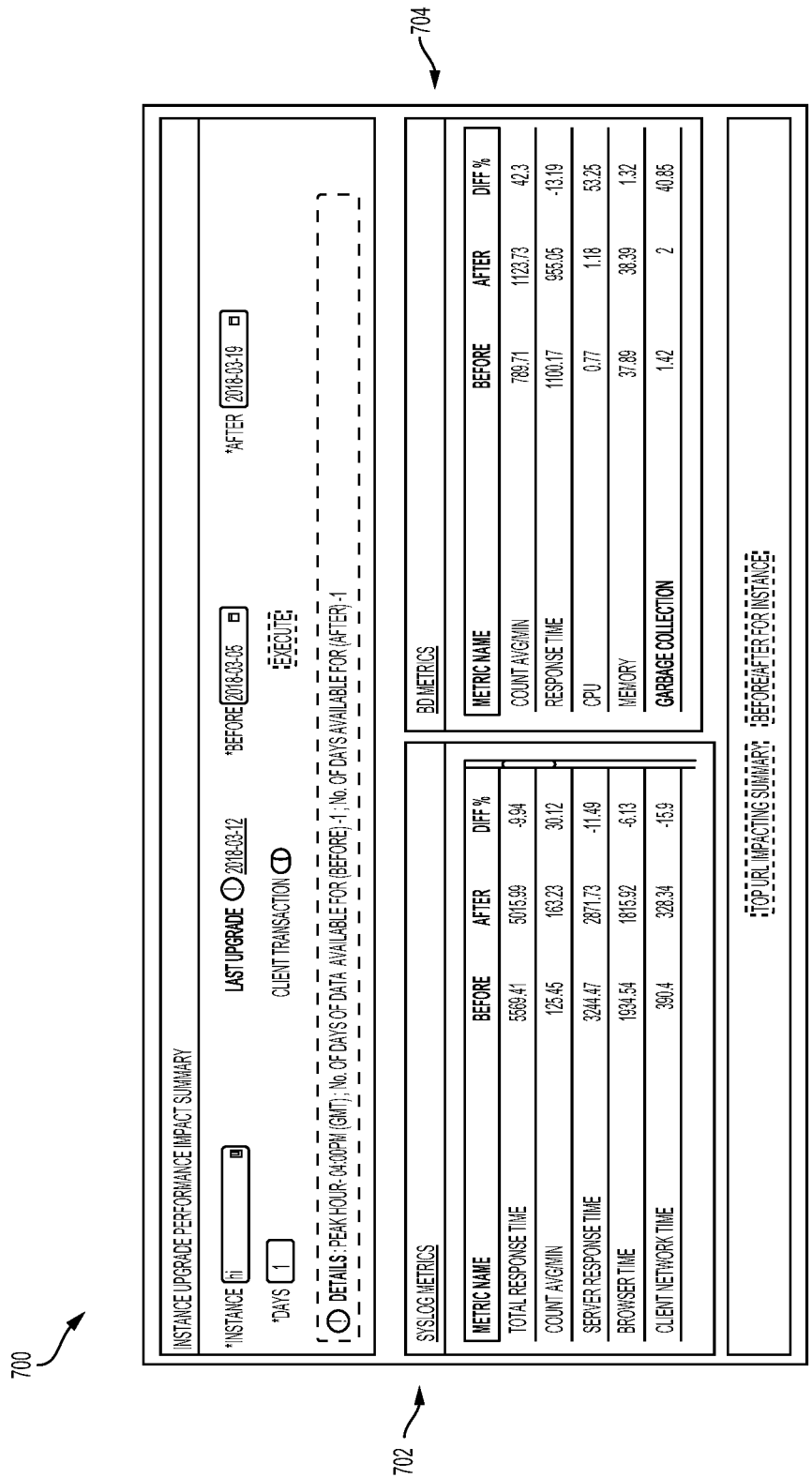
FIG. 7A depicts an example dashboard for performance monitoring of release versions in a remote network management architecture, in accordance with example embodiments.

FIG. 7A depicts an example dashboard 700, which may be used to generate an upgrade performance impact summary, as indicated at the top. Interactive fields in the dashboard include computational instance selection, before and after dates selection, and number of days selection, which together, among other items, may configure a filter. The dashboard also includes an "execute" button for applying the filter. The dashboard 700 also includes two high-level summary sub-windows: a syslog metrics window 702, and "big-data" ("BD") metrics window 704. The term "big data" is just an example descriptor name that could be used to identify performance results, such as those stored in the performance data repository 604 described above for example. As shown, the syslog metrics takes the form of a table that includes columns for metric name, before, after, and percent difference. The table entries are identified by metric name (e.g., total response time, count average per minute, etc.), with values for each column heading for logged transactions for the selected before and after dates. A similar table in generated and displayed for the BD metrics 704.

Figure 7B:
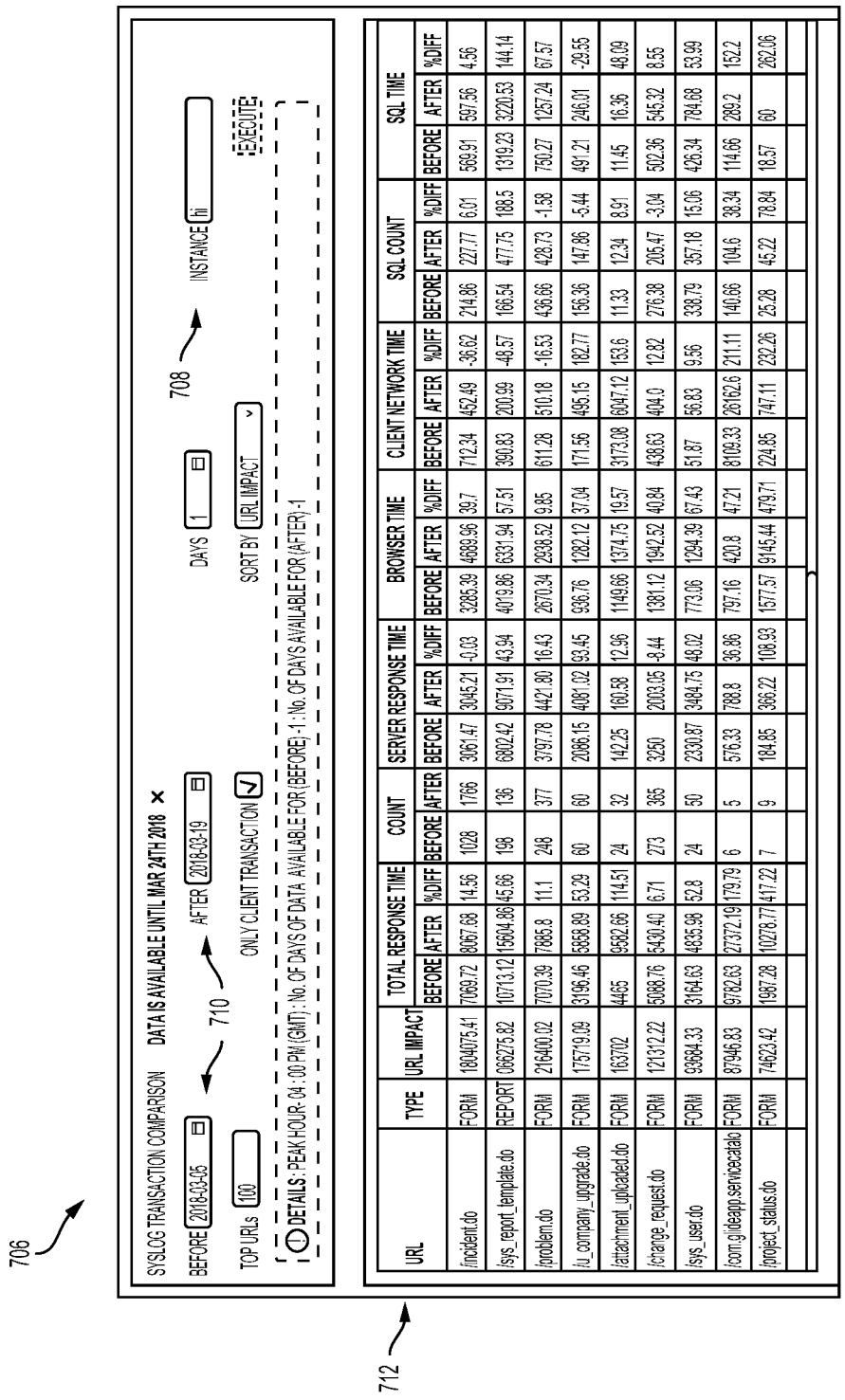
FIG. 7B depicts another example dashboard for performance monitoring of release versions in a remote network management architecture, in accordance with example embodiments.

FIG. 7B depicts an example dashboard 706 for more detailed comparative performance evaluation. Interactive selection fields in the dashboard 706 include instance selection 708, before and after day selection 710, and an execute button, among others. By way of example, a filter has been set for sorting by URL. Clicking the execute button causes a table 712 to be generated and displayed. By way of example the table 712 lists URLs according to impact, and includes columns for identifying the URLs, the impact, metrics of total response time (in units of milliseconds), counts, and component times for server response time, browser time, network time, and database queries. In example embodiments, there could be additional columns for additional component, with a horizontal scroll bar to bring them into the viewing window.

Figure 7C:
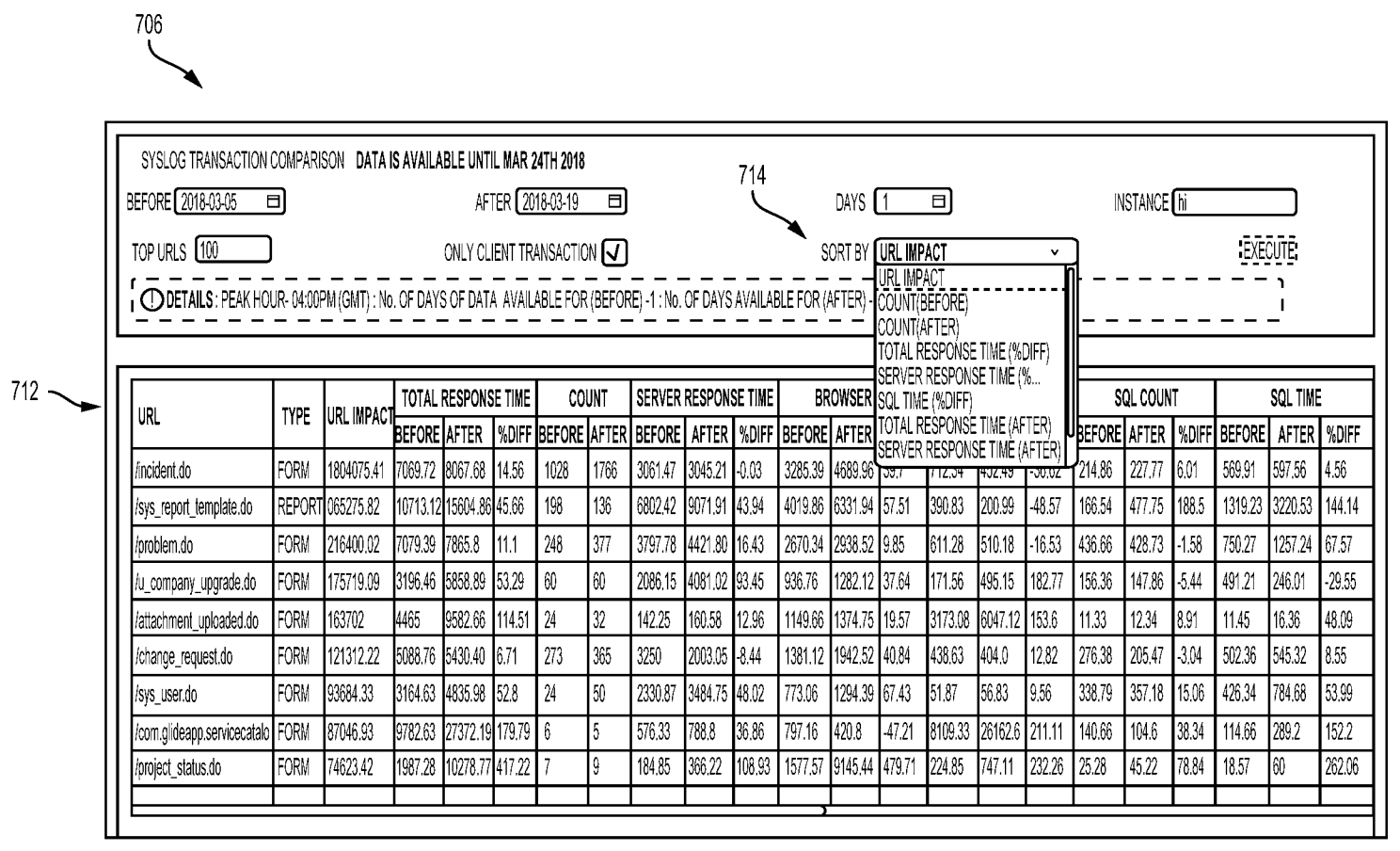

FIG. 7C reproduces the example dashboard 706, but now shows an example drop-down menu of the "sort-by" selection 714. This example illustrates how further and/or alternative refinements and selection could be configured as part of a filter.

Figure 7D:
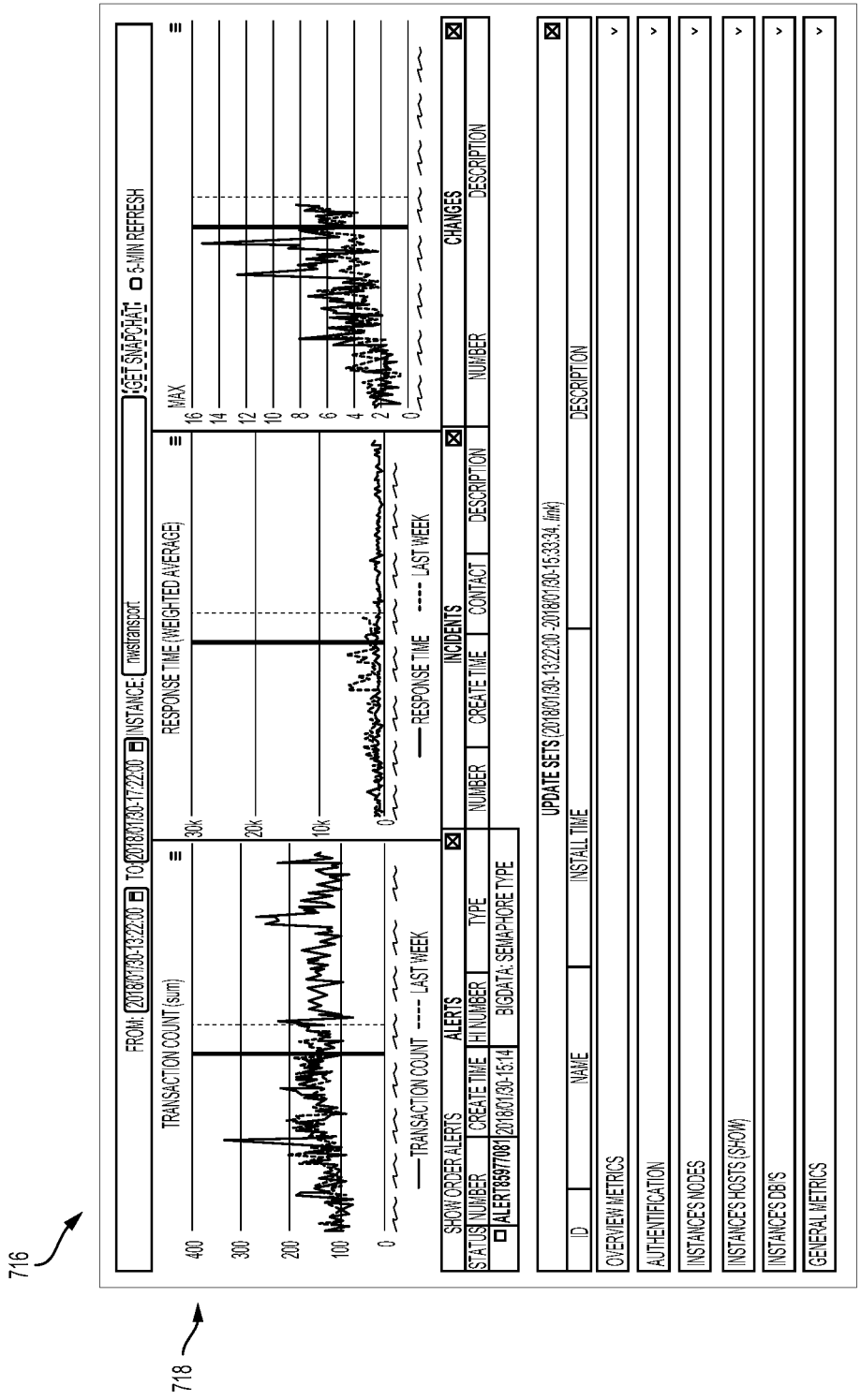
FIG. 7D depicts still another example dashboard for performance monitoring of release versions in a remote network management architecture, in accordance with example embodiments.

FIG. 7D depicts an example dashboard 716 that includes quantitative graphical representations of comparative performance data in data plots 718. In the illustration, before and after plots are dashed or solid lines, respectively. An example plot on the left show transaction counts as a function of time; an example plot in the middle show response time as a function of time; and an example plot on the right shows resource usage (e.g., semaphores) as a function of time.

A system manager or other performance evaluation personnel could use these and other graphical tools of a GUI to evaluate a wide range of performance measures at a high level and/or in detail. The information determined from such displays could be used to trouble-shoot performance issues within a computational instance or across computational instances. A system manager or other personnel could also address customer queries regarding performance after an upgrade, for example. Other examples of applying comparative performance are possible as well.

VI. Example Method

Figure 8:
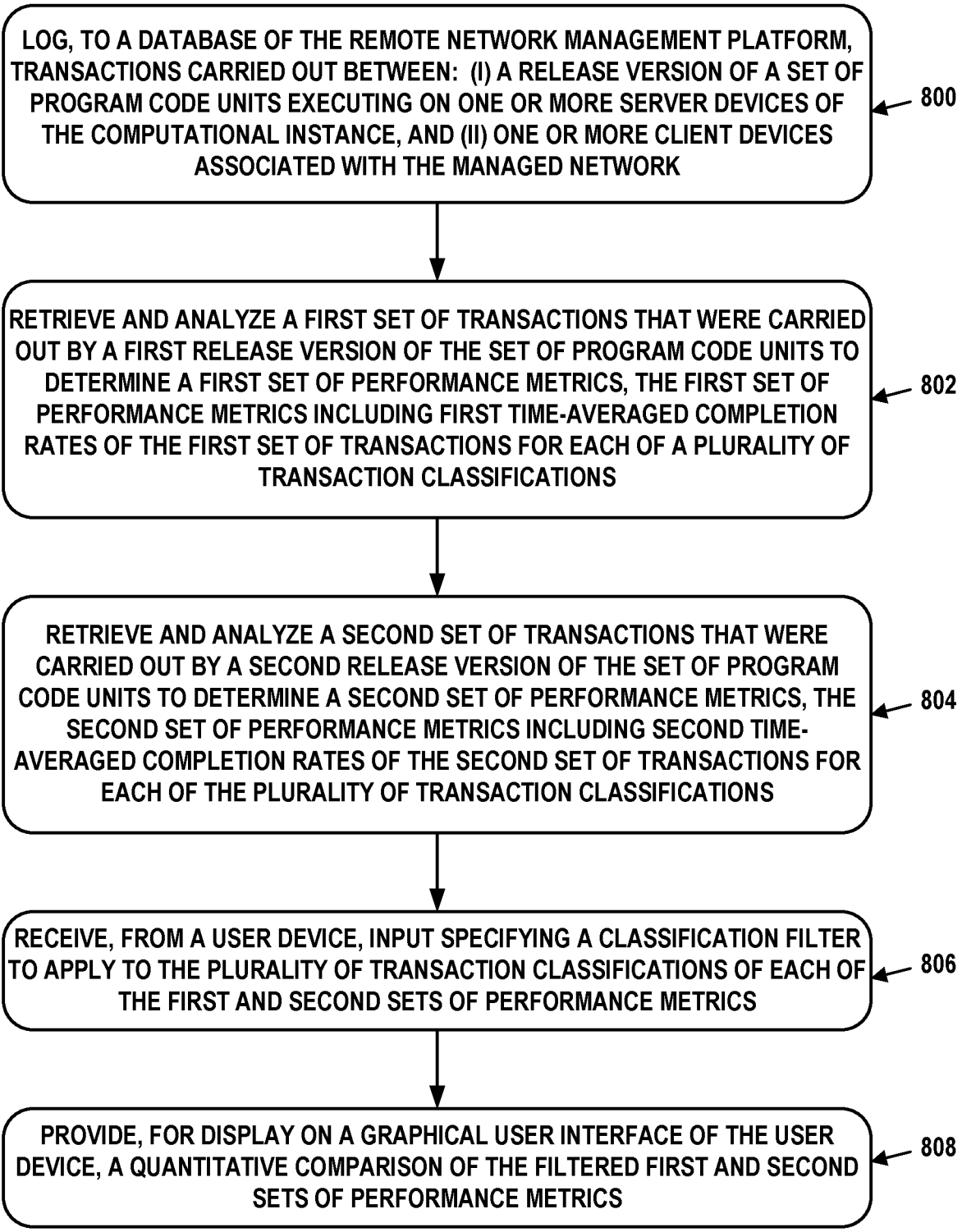
FIG. 8 is a flow chart, in accordance with example embodiments.

FIG. 8 is a flow chart illustrating an example embodiment of a method for comparative performance monitoring and evaluation to two software release versions, such as a previous version and an upgraded version. The method illustrated by FIG. 8 may be carried out by a computing device, such as computing device 100, a cluster of computing devices, such as server cluster 200, and or computing device 602. However, the process can be carried out by other types of devices or device subsystems. For example, the process could be carried out by a portable computer, such as a laptop or a tablet device. In an example embodiment, the method illustrated in FIG. 8 may be carried out by a computing device disposed within a remote network management platform, such as platform 320, which includes one or more computational instances, each configured to remotely manage a managed network, such as network 300. Further, the computing device may be operational to execute a comparative performance monitoring software application.

The embodiments of FIG. 8 may be simplified by the removal of any one or more of the features shown therein. Further, these embodiments may be combined with features, aspects, and/or implementations of any of the previous figures or otherwise described herein.

Block 800 may involve logging transactions to a database of the remote network management platform. In accordance with example embodiments, each transaction may be carried out between one or more server devices of a computational instance and one or more client devices associated with a managed network. Further, in carrying out the transactions, the one or more server devices may be executing a particular release version of a set of program code units.

Block 802 may involve retrieving and analyzing a first set of transactions that were carried out by a first release version of the set of program code units to determine a first set of performance metrics. The first set of performance metrics may include first time-averaged completion rates of the first set of transactions for each of a plurality of transaction classifications. In consideration of the discussion above, completion rates may also be considered the arithmetic inverse of response times.

Block 804 may involve retrieving and analyzing a second set of transactions that were carried out by a second release version of the set of program code units to determine a second set of performance metrics. The second set of performance metrics include second time-averaged completion rates of the second set of transactions for each of the plurality of transaction classifications.

Block 806 may involve receiving input from a user device specifying a classification filter to apply to the plurality of transaction classifications of each of the first and second sets of performance metrics.

Finally, block 808 may involve providing, for display on a graphical user interface (GUI) of the user device, a quantitative comparison of the filtered first and second sets of performance metrics.

In accordance with example embodiments, transactions may include information indicative of a time-rate of completion for each transaction, such as an inverse of response times, as described above. Transactions may also include information identifying a respective group of one or more web-based applications associated with each given transaction, and information indicative of which of the first or second versions of the set of program code units was operational when the given transaction was carried out. A non-limiting example of information identifying a respective group of the one or more web-based applications is a uniform record locator (URL) of website that provides one or more services relating to management of the managed network.

In accordance with example embodiments, the first time-averaged completion rates of the first set of transactions may be time-averaged completion rates of transactions associated with each of the respective groups of the one or more web-based applications as implemented by the first version of the set of program code units. Similarly, the second time-averaged completion rates of the second set of transactions may be time-averaged completion rates of transactions associated with each of the respective groups of the one or more web-based applications as implemented by the second version of the set of program code units. Additionally, each of the respective groups of the one or more web-based applications could correspond to one of the plurality of transaction classifications, and the quantitative comparison of the filtered first and second sets of performance metrics could be a difference between the second and first time-averaged rates for one or more of the respective groups of the one or more web-based applications. A difference between time-averaged response times could be used as well.

In further accordance of example embodiments, the quantitative comparison of the filtered first and second sets of performance metrics further could involve a metric of an impact of the difference between the second and first time-averaged rates (or response times) for each of one or more of the respective groups of the one or more web-based applications. In an example embodiment, the impact for each of the one or more of the respective groups could be the difference for the respective group weighted by a frequency of occurrence of transactions of the respective group, and each impact could be added to a list of impacts for the respective groups. Then, a ranking order of the list of impacts according to relatives sizes of the impacts could be determined.

In further accordance with example embodiments, providing the quantitative comparison of the filtered first and second sets of performance metrics could entail providing at least a portion of the list of impacts in ranking order as display elements. In an example, each display element could correspond to a list entry and comprising the impact and an identification of the respective group of the one or more web-based applications associated with the list entry.

Also in further accordance with example embodiments, each of the respective groups of the one or more web-based applications may be associated with a respective filter category. By way of example, each respective filter category could be one of: (i) a uniform record locator (URL) category, (ii) a network management service category, (iii) a server device identifier category, or (iv) a network resource category. Then, the ranking order of the list of impacts according to relatives sizes of the impacts be a ranked list for a selected one or more of the respective filter categories, where the ranked list corresponds to a ranking order of an impact of updating software of the one or more server devices of the computational instance from the first version to the second version of the set of program code units. The input specifying the classification filter comprises selection criteria could then be at least one of: (i) a filter category, or (ii) a ranking-order scheme, wherein the ranking-order scheme is one of largest-to-smallest, smallest-to-largest, or histogrammed.

In further accordance with example embodiments, the example method may further entail writing the first and second sets of performance metrics to a performance data repository, such as the performance data repository 604.

In further accordance with example embodiments, the example method may further entail logging additional transactions to the database of the remote network management platform. In accordance with example embodiments, each additional transaction may be carried out between one or more server devices of at least one additional computational instance and one or more client devices associated with a respective additional managed network. Further, in carrying out the additional transactions, the one or more server devices may be executing a given release version of a set of program code units. Additionally, the example method may still further entail retrieving and analyzing an additional first set of the additional transactions that were carried out by the first version of the set of program code units to determine an additional first set of performance metrics, and retrieving and analyzing an additional second set of the additional transactions that were carried out by the second version of the set of program code units to determine an additional second set of performance metrics. The additional first set of performance metrics may include additional first time-averaged completion rates of the additional first set of transactions for each of the plurality of transaction classifications, and the additional second set of performance metrics may include additional second time-averaged completion rates of the additional second set of transactions for each of the plurality of transaction classifications.

The example method may then also entail receiving input from the user device specifying a further classification filter to apply to the plurality of transaction classifications of each of: (i) an aggregate of the first set of performance metrics and the additional first set of performance metrics, and (ii) an aggregate of the second set of performance metrics and the additional second set of performance metrics. A quantitative comparison of the filtered aggregate first and aggregate second sets of performance metrics may then be provide for display on the GUI of the user device.

VII. Conclusion

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid state drive, or another storage medium.

The computer readable medium can also include non-transitory computer readable media such as computer readable media that store data for short periods of time like register memory and processor cache. The computer readable media can further include non-transitory computer readable media that store program code and/or data for longer periods of time. Thus, the computer readable media may include secondary or persistent long term storage, like ROM, optical or magnetic disks, solid state drives, compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A computing system comprising:
a database disposed within a remote network management platform, wherein the remote network management platform comprises a computational instance associated with a managed network, the database configured to log transactions carried out between: (i) a set of program code units executing on one or more server devices of the computational instance, and (ii) one or more client devices associated with the managed network; and
a software application, configured to execute on a computing device disposed within the remote network management platform, further configured to:
retrieve and analyze a first set of transactions that were carried out by a first release version of the set of program code units to determine first time-averaged completion rates of the first set of transactions for each of a plurality of transaction classifications;
retrieve and analyze a second set of transactions that were carried out by a second release version of the set of program code units to determine second time-averaged completion rates of the second set of transactions for each of the plurality of transaction classifications, wherein each transaction of the first and second sets of transactions comprise information identifying a respective group of one or more web-based applications associated with the transaction; and
provide, for display on a graphical user interface (GUI) of the user device, a quantitative comparison of the first and second time-averaged completion rates, wherein the quantitative comparison comprises:
an impact metric comprising a difference between the first and second time-averaged completion rates for each of one or more of the respective groups of the one or more web-based applications weighted by a frequency of occurrence of transactions within each of the one or more respective groups; and
a ranking order of the impact metrics for the one or more respective groups according to relative sizes of the impact metrics.

2. The computing system of claim 1, wherein the transactions comprise information indicative of a time-rate of completion for each transaction.

3. The computing system of claim 1, wherein the transactions further comprise
information indicative of which of the first or second versions of the set of program code units was operational when the given transaction was carried out.

4. The computing system of claim 1, wherein each of the respective groups of the one or more web-based applications is associated with a respective uniform record locator (URL) of a website that provides one or more services relating to management of the managed network.

5. The computing system of claim 1, wherein the first time-averaged completion rates of the first set of transactions comprises time-averaged completion rates of transactions associated with each of the respective groups of the one or more web-based applications as implemented by the first version of the set of program code units,
wherein the second time-averaged completion rates of the second set of transactions comprises time-averaged completion rates of transactions associated with each of the respective groups of the one or more web-based applications as implemented by the second version of the set of program code units, and
wherein each of the respective groups of the one or more web-based applications corresponds to one of the plurality of transaction classifications.

6. The computing system of claim 1, wherein providing the quantitative comparison of the first and second time-averaged completion rates comprises:
providing at least a portion of the list of impact metrics in the ranking order as display elements, each display element corresponding to a list entry and comprising the impact metric and an identification of the respective group of the one or more web-based applications associated with the list entry.

7. The computing system of claim 1, wherein each of the respective groups of the one or more web-based applications is associated with a respective filter category of a plurality of filter categories, each respective filter category being one of: (i) a uniform record locator (URL) category, (ii) a network management service category, (iii) a server device identifier category, and (iv) a network resource category,
and wherein the ranking order of the list of impact metrics according to relative sizes of the impact metrics comprises: for a selected one or more of the plurality of filter categories, a ranking order of an impact of updating software of the one or more server devices of the computational instance from the first version to the second version of the set of program code units.

8. The computing system of claim 7, wherein the software application is configured to receive, from a user device, input specifying at least one of: (i) a selected filter category of the plurality of filter categories, or (ii) a ranking-order scheme, wherein the ranking-order scheme is one of largest-to-smallest, smallest-to-largest, or histogrammed.

9. The computing system of claim 1, wherein the computing system further comprises a performance data repository,
wherein determining the first time-averaged completion rates comprises writing the first time-averaged completion rates to the performance data repository,
and wherein determining the second time-averaged completion rates comprises writing the second time-averaged completion rates to the performance data repository.

10. A computing system comprising:
a database disposed within a remote network management platform, wherein the remote network management platform comprises a plurality of computational instances, each associated with a respective managed network, the database configured to log transactions carried out between: (i) a set of program code units executing on one or more server devices of the computational instances, and (ii) one or more client devices associated with the respective managed networks; and
a software application, configured to execute on a computing device disposed within the remote network management platform, and further configured to:

retrieve and analyze a first set of transactions that were carried out by a first release version of the set of program code units to determine first time-averaged completion rates of the first set of transactions for each of a plurality of transaction classifications;

retrieve and analyze a second set of transactions that were carried out by a second release version of the set of program code units to determine second time-averaged completion rates of the second set of transactions for each of the plurality of transaction classifications, wherein each transaction of the first and second sets of transactions comprise information identifying a respective group of one or more web-based applications associated with the transaction; and provide, for display on a graphical user interface (GUI) of the user device, a quantitative comparison of the first and second time-averaged completion rates, wherein the quantitative comparison comprises:
    an impact metric comprising a difference between the first and second time-averaged completion rates for each of one or more of the respective groups of the one or more web-based applications weighted by a frequency of occurrence of transactions within each of the one or more respective groups; and
    a ranking order of the impact metrics for the one or more respective groups according to relative sizes of the impact metrics.

11. The computing system of claim 10, wherein the transactions comprise:
information indicative of a time-rate of completion for each transaction;
information identifying which of the computational instances of the plurality is associated with each transaction; and
information indicative of which of the first or second versions of the set of program code units was operational when the given transaction was carried out.

12. The computing system of claim 10, wherein each of the respective groups of the one or more web-based applications is associated with a respective uniform record locator (URL) of a website that provides one or more services relating to management of the managed network.

13. The computing system of claim 10,
wherein the first time-averaged completion rates of the first set of transactions comprise time-averaged completion rates of transactions associated with each of the respective groups of the one or more web-based applications as implemented by the first version of the set of program code units,
wherein the second time-averaged completion rates of the second set of transactions comprise time-averaged completion rates of transactions associated with each of the respective groups of the one or more web-based applications as implemented by the second version of the set of program code units,
and wherein each of the respective groups of the one or more web-based applications corresponds to one of the plurality of transaction classifications.

14. The computing system of claim 10,
wherein providing the quantitative comparison of the first and second time-averaged completion rates comprises:
providing at least a portion of the list of impact metrics in the ranking order as display elements, each display element corresponding to a list entry and comprising the impact metric and an identification of the respective group of the one or more web-based applications associated with the list entry.

15. The computing system of claim 10, wherein each of the respective groups of the one or more web-based applications is associated with a respective filter category of a plurality of filter categories, each respective filter category being one of: (i) a uniform record locator (URL) category, (ii) a network management service category, (iii) a server device identifier category, and (iv) a network resource category,
and wherein the ranking order of the list of impact metrics according to relative sizes of the impact metrics comprises: for a selected one or more of the plurality of filter categories, a ranking order of an impact of updating software of the one or more server devices of the computational instance from the first version to the second version of the set of program code units.

16. The computing system of claim 11, wherein the first time-averaged completion rates of the first set of transactions comprise time-averaged completion rates of the first set of transactions for each of the computational instances,
wherein the second time-averaged completion rates of the second set of transactions comprise time-averaged completion rates of the second set of transactions for each of the computational instances,
and wherein each of the computational instances corresponds to one of the plurality of transaction classifications.

17. The computing system of claim 16,
wherein providing the quantitative comparison of the filtered first and second time-averaged completion rates comprises:
providing at least a portion of the list of impact metrics in the ranking order as display elements, each display element corresponding to a list entry and comprising the impact metric and an identification of the respective computational instance associated with the list entry.

18. A method carried out by one or more computing devices disposed within a remote network management platform, wherein the remote network management platform comprises a computational instance associated with a managed network, the method comprising:
logging, to a database of the remote network management platform, transactions carried out between: (i) a set of program code units executing on one or more server devices of the computational instance, and (ii) one or more client devices associated with the managed network;
retrieving and analyzing a first set of transactions that were carried out by a first release version of the set of program code units to determine first time-averaged completion rates of the first set of transactions for each of a plurality of transaction classifications;
retrieving and analyzing a second set of transactions that were carried out by a second release version of the set of program code units to determine second time-averaged completion rates of the second set of transactions for each of the plurality of transaction classifications, wherein each transaction of the first and second sets of transactions comprise information identifying a respective group of one or more web-based applications associated with the transaction; and
providing, for display on a graphical user interface (GUI) of the user device, a quantitative comparison of the first and second time-averaged completion rates, wherein the quantitative comparison comprises:

an impact metric comprising a difference between the first and second time-averaged completion rates for each of one or more of the respective groups of the one or more web-based applications weighted by a frequency of occurrence of transactions within each of the one or more respective groups; and a ranking order of the impact metrics for the one or more respective groups according to relative sizes of the impact metrics.

19. The method of claim 18, wherein the remote network management platform comprises at least one additional computational instance, each associated with a respective additional managed network, and wherein the method further comprises:

logging, to the database of the remote network management platform, additional transactions carried out between: (i) the set of program code units executing on one or more server devices of the at least one additional computational instance, and (ii) one or more client devices associated with the respective additional managed network;

retrieving and analyzing an additional first set of the additional transactions that were carried out by the first version of the set of program code units to determine additional first time-averaged completion rates of the additional first set of transactions for each of the plurality of transaction classifications;

retrieving and analyzing an additional second set of the additional transactions that were carried out by the second version of the set of program code units to determine additional second time-averaged completion rates of the additional second set of transactions for each of the plurality of transaction classifications; and receiving, from the user device, input specifying a classification filter to apply to the plurality of transaction classifications of each of: (i) an aggregate of the first time-averaged completion rates and the additional first time-averaged completion rates, and (ii) an aggregate of the second time-averaged completion rates and the additional second time-averaged completion rates; and providing, for display on the GUI of the user device, a quantitative comparison of the filtered aggregate first and aggregate second time-averaged completion rates.

* * * * *